US012689645B2

(12) United States Patent
Wicker et al.

(10) Patent No.: US 12,689,645 B2
(45) Date of Patent: Jul. 21, 2026

(54) AGENT-BASED SEARCHING OVER HETEROGENEOUS DATA SOURCES

(71) Applicant: Microsoft Technology Licensing, LLC, Redmond, WA (US)

(72) Inventors: Andrew White Wicker, Fall City, WA (US); Max Piasevoli, New York, NY (US); Quang Minh Nguyen, Redmond, WA (US); Srisuma Movva, Seattle, WA (US); Kadri Tahsildoost, Bellevue, WA (US); Haijun Zhai, Bothell, WA (US); Anand Mudgerikar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 18/938,213

(22) Filed: Nov. 5, 2024

(65) Prior Publication Data

US 2026/0129061 A1 May 7, 2026

(51) Int. Cl.
*H04L 9/40* (2022.01)
*G06F 16/2455* (2019.01)
*G06F 16/2457* (2019.01)

(52) U.S. Cl.
CPC ...... *H04L 63/1425* (2013.01); *G06F 16/2456* (2019.01); *G06F 16/24575* (2019.01)

(58) Field of Classification Search
CPC ............. H04L 63/1425; G06F 16/2456; G06F 16/24575
See application file for complete search history.

(56) References Cited

U.S. PATENT DOCUMENTS 7,840,538 B2 * 11/2010 Joshi ..................... G06F 16/332
                                                                 707/672
8,407,214 B2 * 3/2013 Li ........................ G06F 16/3338
                                                                 707/726

(Continued)

OTHER PUBLICATIONS

Li et al., "Meta Engine: A Unified Semantic Query Engine on Heterogeneous LLM-Based Query Systems", Feb. 2, 2026 (Note: appears to be a re-issue of a 2020 paper), PVLDB Endowment, vol. 14, No. 1 ISSN 2150-8097, pp. 1-13 (Year: 2020).*

(Continued)

*Primary Examiner* — Jorge A Casanova
(74) *Attorney, Agent, or Firm* — Pillsbury Winthrop Shaw Pittman LLP

(57) ABSTRACT

Searching heterogeneous cybersecurity data sources is described. A natural language search enables searching across available data sources, independent of underlying storage architectures or query languages. This capability leverages multiple task-specific agents, large language models, and data map representation-based approaches, and enables integration of new data sources into the search process with minimal additional computing resources. The searching includes determining a data map representation for available data sources (which might have different storage architectures or query languages), which indicates relationships between the available data sources. Query intent associated with a query is determined. A query intent task is determined by mapping the query intent to a relevant data source according to the data map representation. A search agent parameterized for searching the relevant data source executes the query intent task. The result of this executed query intent task is used to augment a response to the query.

20 Claims, 10 Drawing Sheets

(56) References Cited

U.S. PATENT DOCUMENTS

| 8,412,746 | B2 * | 4/2013 | Fox | G06F 16/2471 |
| | | | | 707/799 |
| 9,189,549 | B2 * | 11/2015 | Rubinstein | G06F 16/951 |
| 9,373,322 | B2 * | 6/2016 | Goussard | G06F 40/20 |
| 9,870,423 | B1 * | 1/2018 | Bousquet | G06F 16/951 |
| 2009/0043749 | A1 * | 2/2009 | Garg | G06F 16/3338 |
| | | | | 707/999.005 |
| 2009/0077047 | A1 * | 3/2009 | Cooper | G06F 40/30 |
| 2011/0289063 | A1 * | 11/2011 | Radlinski | G06Q 30/00 |
| | | | | 707/706 |
| 2012/0124070 | A1 * | 5/2012 | Mishra | G06F 16/90324 |
| | | | | 707/E17.069 |
| 2013/0325838 | A1 * | 12/2013 | Liao | G06F 16/9038 |
| | | | | 707/E17.082 |
| 2017/0011310 | A1 * | 1/2017 | Hu | G06N 20/00 |
| 2021/0349925 | A1 * | 11/2021 | Panineerkandy | G06F 16/3344 |
| 2025/0068857 | A1 * | 2/2025 | Lakshmikanthan | G06F 40/30 |
| 2025/0165890 | A1 * | 5/2025 | Medford | G06F 8/10 |
| 2026/0046317 | A1 * | 2/2026 | Crabtree | H04L 63/20 |

OTHER PUBLICATIONS

Duggan, et al., "The BigDAWG Polystore System", ACM SIGMOD Record, vol. 44, No. 02, Jun. 30, 2015, pp. 11-16.
International Search Report and Written Opinion received for PCT Application No. PCT/US2025/039376, mailed on Oct. 30, 2025, 14 Pages.

* cited by examiner

Example Cybersecurity Application (without System 100 – Fig 1A – 1D)

Scenario 200

202 Find Recent Ransomware Activity

204 Little Starting Information

206 Obtain Security Tool

208 Write Complex Queries

210 Validate Results

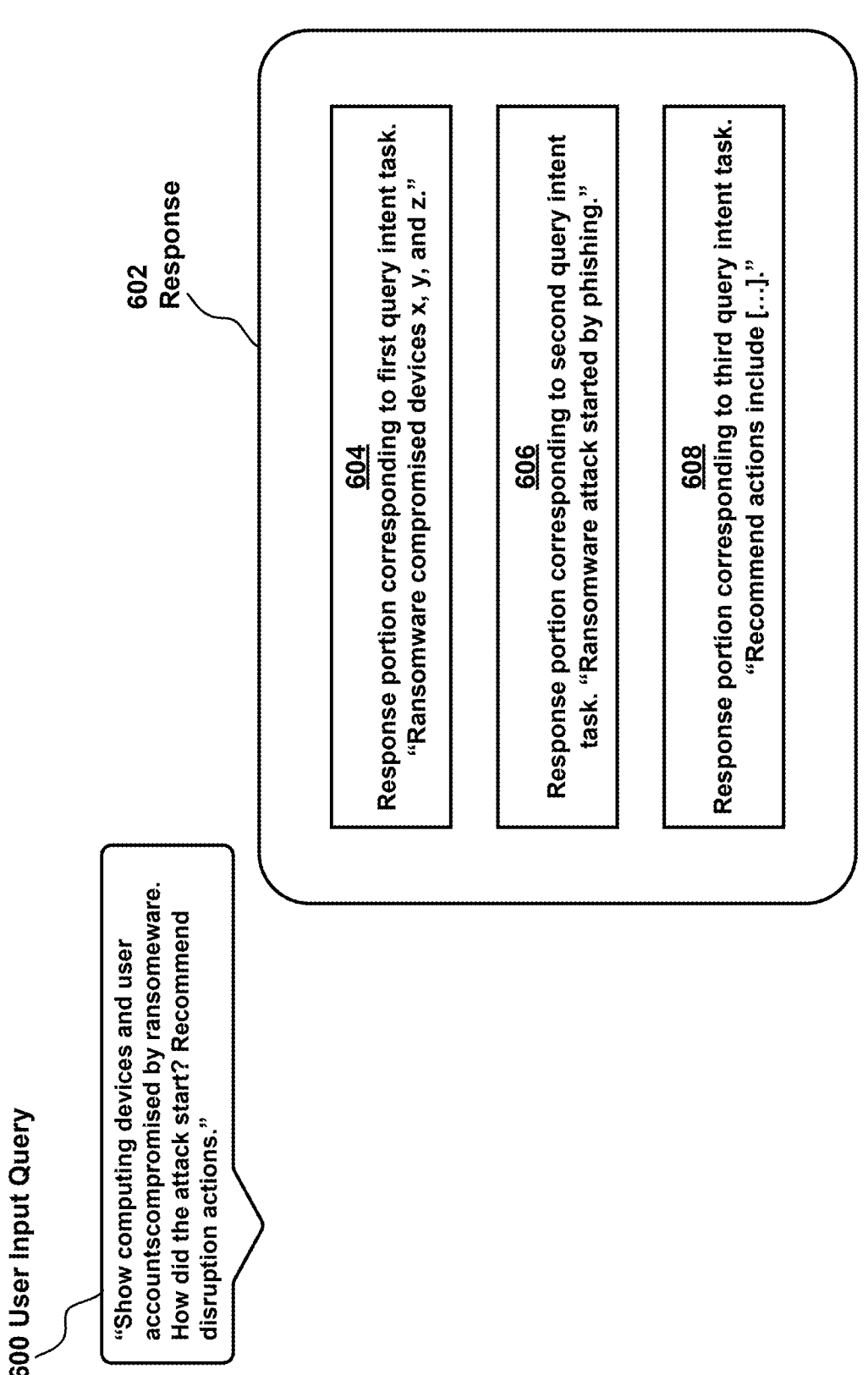

600 User Input Query

"Show computing devices and user accounts compromised by ransomeware. How did the attack start? Recommend disruption actions."

602 Response

Response

604
Response portion corresponding to first query intent task. "Ransomware compromised devices x, y, and z."

606
Response portion corresponding to second query intent task. "Ransomware attack started by phishing."

608
Response portion corresponding to third query intent task. "Recommend actions include [...]."

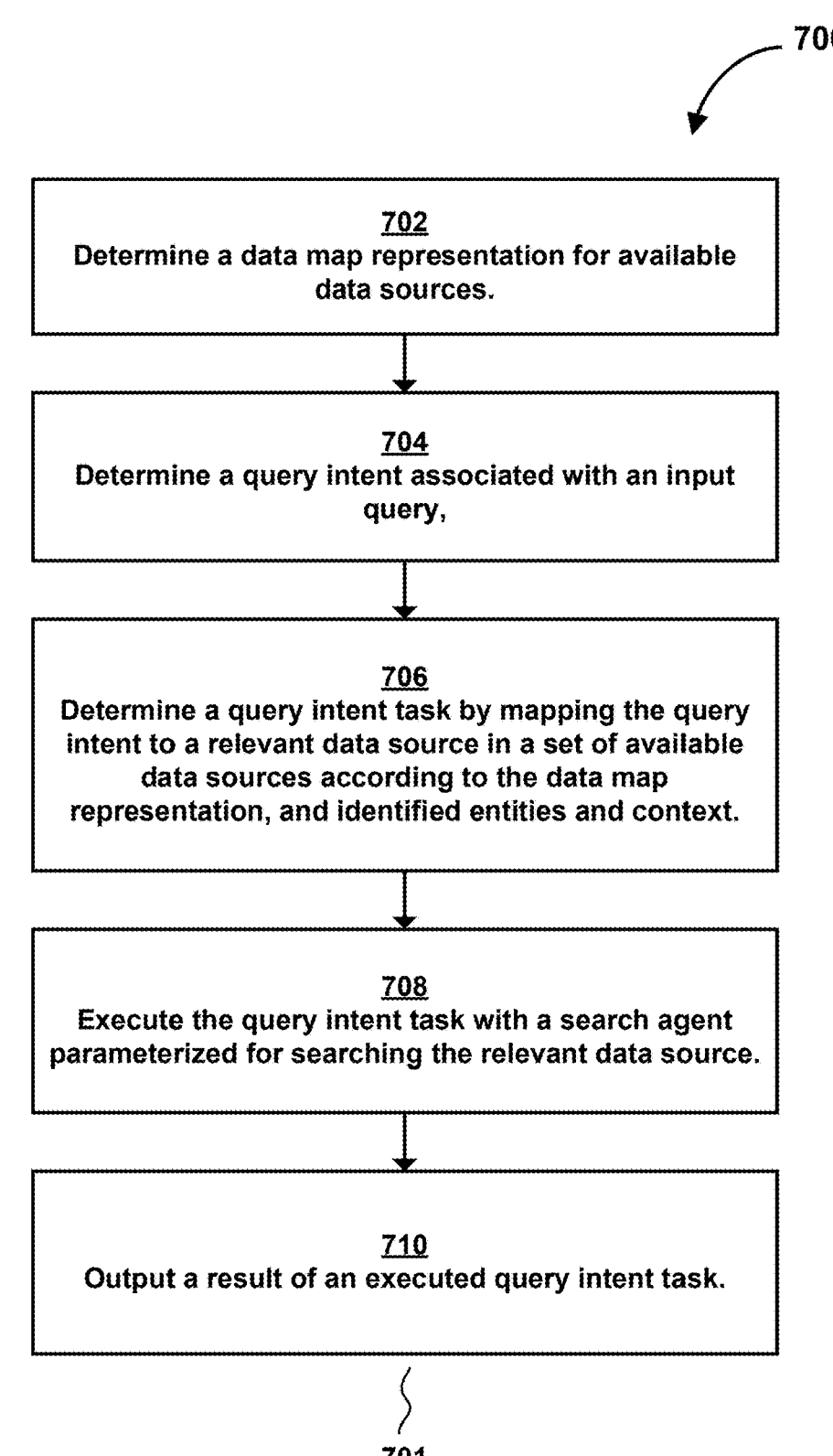

702
Determine a data map representation for available data sources.

704
Determine a query intent associated with an input query,

706
Determine a query intent task by mapping the query intent to a relevant data source in a set of available data sources according to the data map representation, and identified entities and context.

708
Execute the query intent task with a search agent parameterized for searching the relevant data source.

710
Output a result of an executed query intent task.

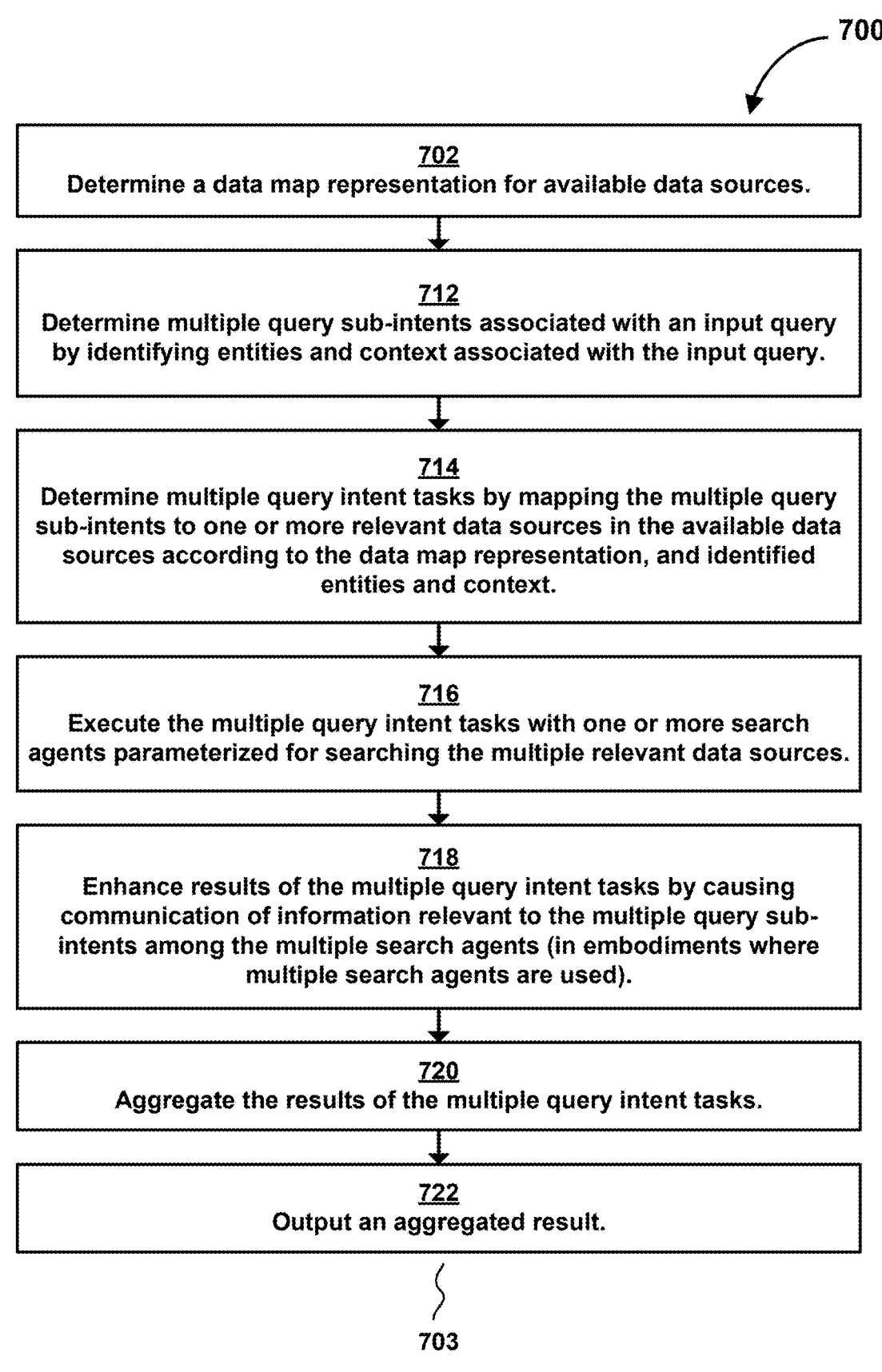

700

702
Determine a data map representation for available data sources.

712
Determine multiple query sub-intents associated with an input query by identifying entities and context associated with the input query.

714
Determine multiple query intent tasks by mapping the multiple query sub-intents to one or more relevant data sources in the available data sources according to the data map representation, and identified entities and context.

716
Execute the multiple query intent tasks with one or more search agents parameterized for searching the multiple relevant data sources.

718
Enhance results of the multiple query intent tasks by causing communication of information relevant to the multiple query sub-intents among the multiple search agents (in embodiments where multiple search agents are used).

720
Aggregate the results of the multiple query intent tasks.

722
Output an aggregated result.

704
Determine a query intent associated with an input query.

706
Determine a query intent task by mapping the query intent to a relevant data source in a set of available data sources according to the data map representation, and identified entities and context.

708
Execute the query intent task with a search agent parameterized for searching the relevant data source.

705

AGENT-BASED SEARCHING OVER HETEROGENEOUS DATA SOURCES

BACKGROUND

This disclosure generally relates to agent-based searching over heterogeneous data sources.

Retrieval-Augmented Generation (RAG) is a technique that combines the strengths of information retrieval and natural language generation. In RAG, when a user provides a query or input to a large language or other model, relevant information from an external database, document, or other source is retrieved. The retrieved information is used to guide or enhance the generation of a more accurate, contextually relevant response to the query. By leveraging both retrieval and generation, RAG can handle complex queries, ensuring that generated outputs are coherent and grounded in relevant, up-to-date information from external sources. This approach improves the quality and accuracy of responses in tasks requiring deep knowledge or current information, such as question answering or summarization.

SUMMARY

For many applications, the vast number of available data sources (e.g., external databases, documents, or other sources) makes it difficult to know where to find relevant information (for RAG or other techniques) needed to answer a query. In addition, users are often unable to make optimal decisions to provide guidance (for RAG or other techniques) as to where or what to search due to their own limited knowledge of available data sources, such as when a new external database of information has only recently been created. There are also a wide variety of storage architectures used for these external data sources, each of which might require a different query language. These challenges result in a burdensome search requiring significant computing resources (e.g., a plurality of singularly programmed search agents, sometimes one for each data source architecture or query language as one example) and computing effort (e.g., computing resources used for review and identification of a relevant data source from a large number of available data sources) that is time-consuming and error prone, among other issues.

Advantageously, dynamic agent-based searching over heterogeneous data sources is described. A natural language search capability enables users and autonomous agents to search across available data sources, independent of the underlying storage architectures or query languages. This capability leverages multiple task-specific agents, multimodal models, and data map representation-based approaches. Reasoning based on a data map representation directs searches by the task-specific agents. This enables integration of new data sources into the search process with minimal additional computing resources, among other advantages.

Some embodiments include a method for dynamic searching over heterogeneous data sources. Querying heterogeneous cybersecurity data is one example practical application. The method comprises determining a data map representation for available data sources. The data map representation indicates relationships between the available data sources. The available data sources have at least one of different storage architectures or different query languages. The method comprises determining a query intent associated with an input query by identifying entities and context associated with the input query. A query intent comprises an inference as to why a user asked a question or made a request in the input query, for example. The method comprises determining a query intent (or search) task by mapping the query intent to a relevant data source in the available data sources according to the data map representation, and identified entities and context (e.g., reasoning). The query intent task is executed with a search agent parameterized for searching the relevant data source (e.g., the reasoning directing the search agent). Output comprises a result of an executed query intent task. The result of this executed query intent task is used to augment a response to the query for a user.

In some embodiments, multiple query intent tasks are determined by mapping the query intent to multiple relevant data sources in the available data sources according to the data map representation, and the identified entities and context. The multiple query intent tasks are executed with one or more search agents. In some embodiments, the multiple query intent tasks are executed with multiple search agents individually parameterized for searching the multiple relevant data sources. Results of the multiple query intent tasks are enhanced by causing communication of information relevant to the query intent among the multiple search agents. Causing the communication of information relevant to the query intent among the multiple search agents comprises providing output from one search agent as additional input to another search agent for performing that search agent's query intent task. The information relevant to the query intent is determined by the multiple search agents as part of executing the multiple query intent tasks. The information relevant to the query intent comprises at least one of insights conveying relevant data for satisfying the input query or a result from a given search agent's query intent task. The results of the multiple query intent tasks are aggregated and the result is output based on the aggregation.

In some embodiments, multiple sub-query intents associated with the input query are determined by identifying the entities and context associated with the input query. The multiple query intent tasks are determined by mapping the multiple sub-query intents to one or more relevant data sources according to the data map representation, and the identified entities and context.

In some embodiments, the available data sources comprise a data estate of a user with at least one of databases, data tables, or columns of data.

In some embodiments, the relationships between available data sources comprise at least one of semantic similarities, joinable fields, common labels, or metadata indicative of commonalities between data in the available data sources.

In some embodiments, determining the data map representation comprises generating at least one of descriptions or metadata for the available data sources. The descriptions or metadata are configured to enhance semantic understanding of data in an available data source. In some embodiments, the data map representation comprises at least one of a data map graph, a semantic similarity graph, or a metadata database.

In some embodiments, the data map representation is determined using various semantic functions. A semantic function comprises an algorithm configured to capture meaning behind data in the available data sources, rather than surface-level structure of the data in the available data sources. A semantic function is configured to provide information about how to query the relevant data source. A semantic function is configured to provide information about how data between two or more different available data sources is related.

In some embodiments, entities comprise tokens associated with at least one of specific, identifiable items or concepts that have meaning within the input query. The entities are associated with an application of interest.

In some embodiments, context comprises tokens associated with at least one of surrounding information, background, or situational factors present in the input query that influence determining the query intent associated with the input query.

In some embodiments, determining the query intent associated with an input query comprises decomposing the input query by evaluating qualifiers in the input query related to at least one of the entities or the context.

In some embodiments, the search agent (or search agents) is (are) parameterized for searching a relevant data source but not other data sources in the available data sources.

Some embodiments include a tangible, non-transitory, machine-readable memory storing instructions that, when executed by a data processing apparatus such as a processor, cause the data processing apparatus to perform one or more described operations.

Some embodiments include a system comprising one or more processors, memory, or other components. The memory stores instructions that, when executed by the one or more processors, effectuate one or more described operations.

Even though cybersecurity applications are described in several examples, the described techniques have a wide range of applications where available data sources are vast, and have different storage architectures, query languages, or other characteristics.

BRIEF DESCRIPTION OF THE DRAWINGS

The above-mentioned aspects and other aspects of the present techniques will be better understood when the present application is read in view of the following figures in which like numbers indicate similar or identical elements.

FIG. 6 illustrates a user input query and a corresponding response.

DETAILED DESCRIPTION OF CERTAIN EMBODIMENTS

Figure 1A:
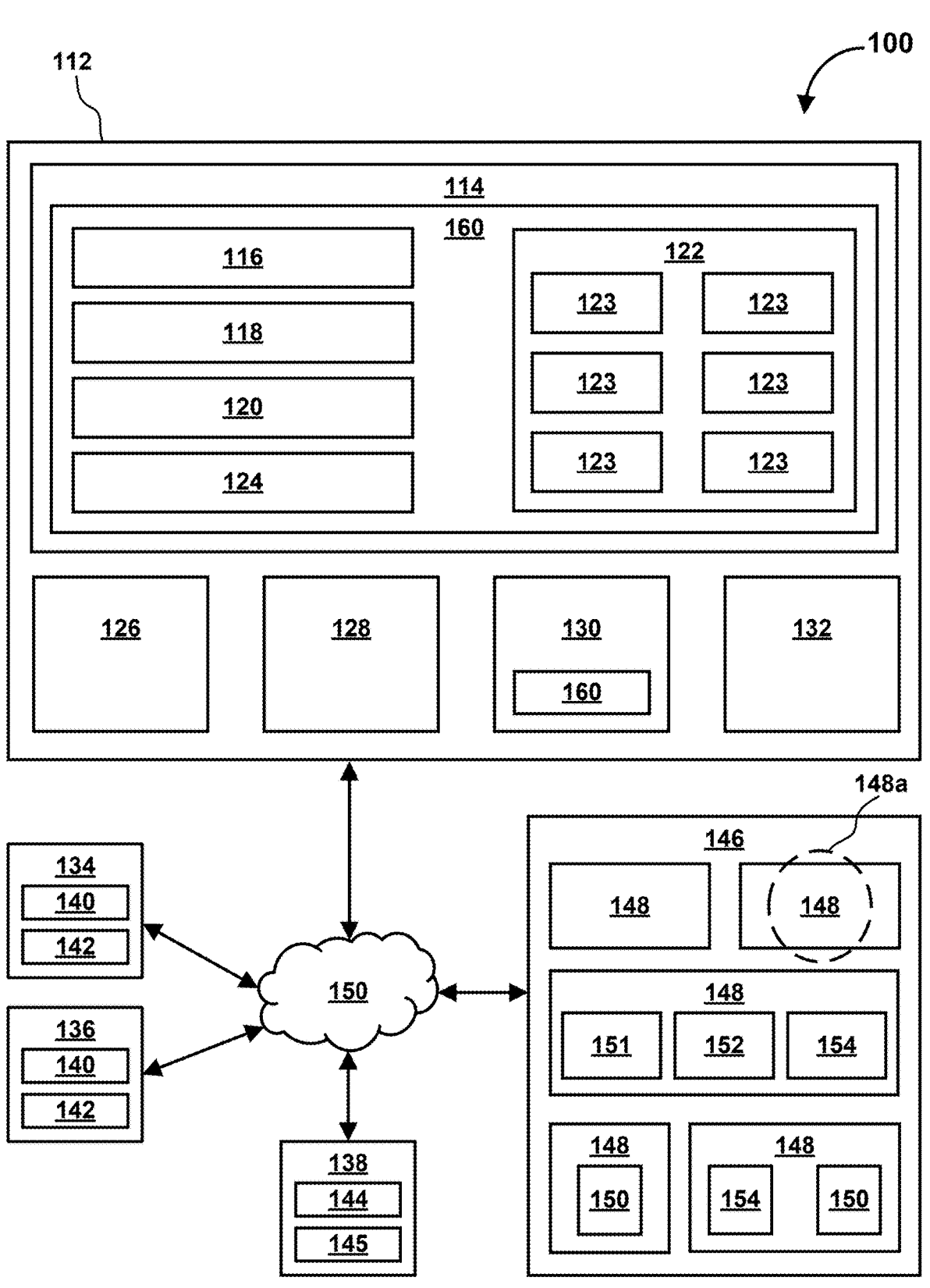
FIG. 1A is a logical-architecture block diagram that illustrates a system configured for dynamic agent-based searching over heterogeneous data sources.

FIG. 1A illustrates a system 100 comprising a computing engine 112 and other components configured for dynamic agent-based searching over heterogeneous data sources. Heterogeneous data sources comprise different types of data repositories or systems that store information in various formats, structures, or modalities, as described in more detail below. The searching is dynamic in the sense that it is not static or fixed, but instead able to change, or interact differently with different user queries or data sources. The searching is adapted for one or multiple different data sources, based on a user's input query (e.g., as or just after that query is received). System 100 is configured to execute different searches of different available data sources based on different user input queries.

This dynamic agent-based searching includes determining (or "learning") a data map representation over available data sources. The data map representation indicates how databases, tables, columns, and other data assets in the available data sources are related to each other. The data map representation is determined using various semantic functions, with no human involvement necessary. An input query is decomposed to identify relevant entities and context. One or more query intents are mapped from the input query to the most relevant data sources using the data map representation, the entities, and the context. Additionally, one or more query intent (or search) tasks are determined. The query intent tasks are executed by search agents parameterized for searching different available data sources, such as those with different storage architectures, or those that use different query languages. These search agents intercommunicate as they gain insights or determine results that are relevant to the query intent. The search results are evaluated and combined to produce a final response for a user.

Prior approaches for querying data using large language model agents (as in RAG) typically focus on a simple natural language request and a single storage architecture or query language. Such approaches are unable to handle complex search requests that potentially span over multiple available data sources, with multiple storage architectures, or require multiple query languages. In contrast, the current dynamic agent-based searching approach supports search requests with varying levels of complexity which require searching available data sources with different storage architectures, query languages, or other characteristics. This is accomplished by determining query intent associated with a query, along with significant data (e.g., entities, context, etc.) referenced in the query. The query intent is used to guide specific query intent tasks for relevant data sources. As part of this process, a complex intent is decomposed into sub-query intents to better facilitate identification of multiple relevant data sources. A complex intent is associated with a multi-faceted query that involves multiple components or layers of information. It goes beyond simple, straightforward queries and often requires retrieval and integration of different types of data or knowledge to generate an appropriate response.

In the data map representation, relationships between available data sources comprise semantic similarities, joinable fields, common labels, metadata indicative of commonalities between data in the available data sources, or other relationships. Determining the data map representation comprises generating descriptions or metadata for the available data sources, which enhances the semantic understanding of data in an available data source (and alleviates an otherwise tedious human-driven task). The data map is used to align a query intent with the relevant data sources. The data map also specifies commonalities between data sources that can be joined, if present, such that the query intent drives search or retrieval of data from one or multiple available data sources. New data sources only need to be reflected in the data map representation, with a corresponding search agent configured to search the new data source, in order to be included in the present dynamic agent-based searching.

Unlike prior approaches, one or more specifically parameterized search agents are used to search the different available data sources (e.g., with the different storage architectures, the different query languages, etc.). These search agents gather insights (i.e., relevant data for satisfying the query), which are then combined and evaluated for a final output response to a user. This methodology is advantageous since it provides a unified, natural language search experience for users that does not require users to have knowledge of all available data sources, the underlying storage architecture technology, the query languages required to retrieve data, etc. This significantly reduces the time required to construct queries and addresses common sources of error in search.

In these and other ways, system 100 provides technical solutions to technical problems related to electronically accessing data sources having a wide variety of storage architectures, each of which might require a different query language, and determining which data sources to access at all. System 100 provides a new structure (e.g., reasoning on top of search agents) that facilitates information retrieval from data sources with different storage architectures, query languages, or other characteristics. System 100 also improves human-computer interaction, reduces the burden on a user to decide what to enter in an input query to a computing device, and increases computing efficiency by using reasoning on top of search agents to decide what and how to search, and by enhancing results with communication of information relevant to a query intent among multiple search agents. This facilitates better tailoring of output content to a user based on the user's input query, among other advantages.

For example, in a typical RAG approach, an encoded input or embedding is used to align an input with data in an embedding database. Data associated with similar embeddings is incorporated into a prompt-flow to improve outputs for a user. However, beyond comparing embeddings, there is no reasoning about how to retrieve data, what data to retrieve, or what to do if a certain database has an incompatible storage architecture or query language. Also, retrieval results are limited only to results associated with the similar embeddings.

Conversely, the current dynamic agent-based searching approach utilizes an input (an encoded embedding or otherwise) as a means for pivoting into the data map representation, which is further traversed and reasoned over as described herein in order to identify relevant available data sources. This reasoning guides a query intent task that is carried out by one or more search agents parameterized for the available data sources. Thus, the present approach does not use an embedding lookup as with RAG to augment prompts, but rather uses an input to provide a starting point within a data map for an agent to continue reasoning.

Figure 2:
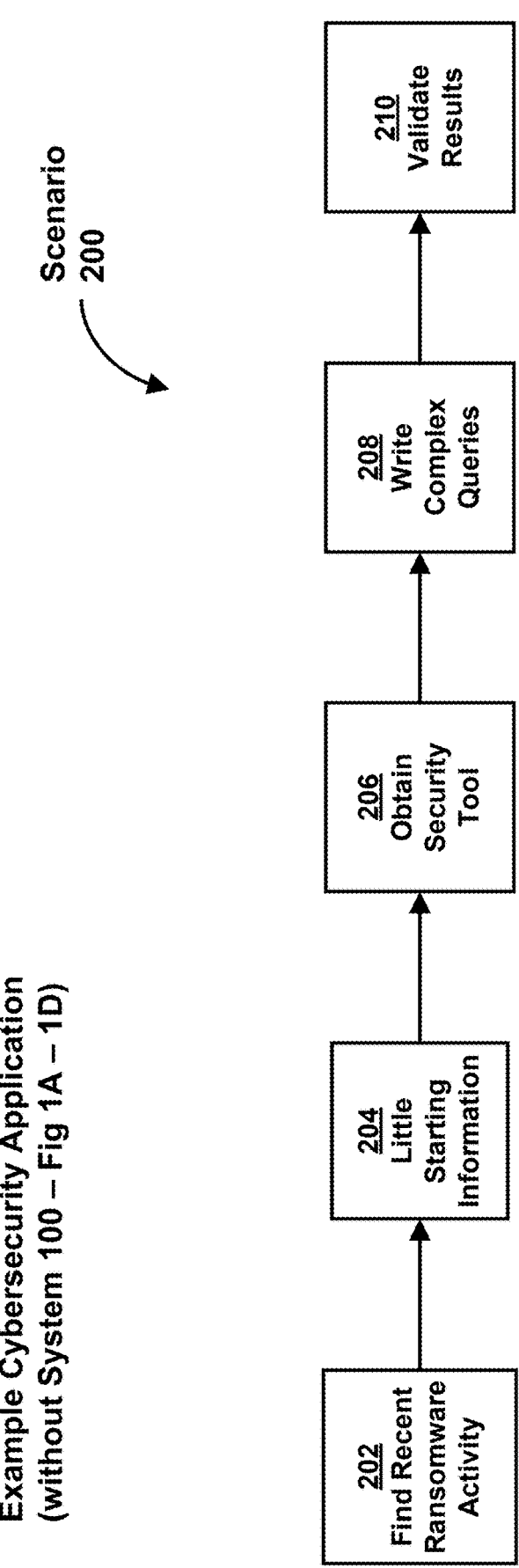
FIG. 2 illustrates an example scenario where an analyst is tasked with finding recent ransomware activity in the data estate of a client.

One example practical application of the techniques described herein is in the field of cybersecurity. FIG. 2 illustrates an example scenario 200 where, at operation 202, an analyst is tasked with finding recent ransomware activity in the data estate of a client (e.g., the universe of data associated with the client including databases, logs, documents, etc.). At operation 204 the analyst is provided with relatively little starting information, potentially only knowing identification information associated with the client or the client's data estate. At operation 206, without system 100 (FIG. 1A), the analyst is required to obtain a security tool that has the necessary raw data resources, including a listing of security incidents from the client, and, at operation 208, write complex (e.g., Kusto Query Language (KQL)) queries based on the analysts' security domain knowledge. Finally, at operation 210, assuming operations 202-208 are successful, the analyst must still validate whether results from the analysts' searches are relevant.

With system 100, the analyst could simply submit a natural language query requesting that system 100 finds the recent ransomware activity. The query is analyzed (as described below) to determine a query intent. The query intent is used in combination with a data map representation to identify relevant available data sources (e.g., potentially with the different storage architectures, the different query languages, etc.—no need for separate KQL queries). One or more automatically generated query intent (e.g., search) tasks are executed by one or more search agents parameterized for the available data sources. The result(s) of the executed search task(s) is (are) used to generate an output response to the analyst.

Returning to FIG. 1A, more details related to the technical solution(s) provided by system 100 are described below, after introducing the components of system 100 and describing their operation. It should be noted, however, that not all embodiments necessarily provide all of the benefits outlined herein, and some embodiments provide all or a subset of these benefits or different benefits, as various engineering and cost tradeoffs are envisioned, which is not to imply that other descriptions are limiting.

System 100 includes computing engine 112, mobile user devices 134 and 136, a desktop user device 138, and external resources 146. Interaction with users or other entities occurs via a website or a native application viewed on a desktop user device 138, a mobile user device 134 or 136, or other components. In some embodiments, interaction occurs via a desktop user device 138 such as a desktop computer, a mobile website viewed on a smart phone, tablet, or other mobile user device 134 or 136, or via a special-purpose native application executing on a smart phone, tablet, or other mobile user device. Providing dynamic agent-based searching over heterogeneous data sources across a variety of devices is expected to make it easier for users to request or receive desired information when and where convenient for the user, or have other advantageous effects.

In some embodiments, computing engine 112 includes one or more of a processor 114, an application program interface (API) server 126, a web server 128, a memory 130, and a cache server 132. These components, in some embodiments, communicate with one another in order to provide the functionality of computing engine 112 described herein.

To illustrate an example of the environment in which computing engine 112 operates, FIG. 1A includes a number of components with which computing engine 112 communicates: mobile user devices 134 and 136; a desktop user device 138; and external resources 146. Each of these devices communicates with computing engine 112 via a network 150, such as the Internet or the Internet in combination with various other networks, like local area networks, cellular networks, Wi-Fi networks, or personal area networks.

Mobile user devices 134 and 136 comprise smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of mobile user devices 134 and 136 stores instructions that when executed by the associated processor provide an operating system and various applications, including a web browser 142, a native mobile application 140, or both. The desktop user device 138 also includes a web browser 144, a native application 145, or other electronic resources. In addition, desktop user device 138 includes a monitor; a keyboard; a mouse; memory; a processor; and a tangible, non-transitory, machine-readable memory storing instructions that when executed by the processor provide an operating system and the web browser 144 or the native application 145.

Native applications 140 and 145, and web browsers 142 and 144, in some embodiments, are operative to provide a graphical user interface associated with a user, for example, which communicates with computing engine 112 and facilitates user interaction with data from computing engine 112. In some embodiments, computing engine 112 is stored on or otherwise executed by user computing resources (e.g., a user computer, server, etc., such as mobile user devices 134 and 136, and desktop user device 138 associated with a user), servers external to the user, or in other locations. In some embodiments, computing engine 112 is be run as an application (e.g., an app such as native application 140) on a server, a user computer, or other devices.

External resources 146 include sources of information such as databases, websites, etc.; external entities participating with system 100; one or more servers outside of system 100; a network (e.g., the internet); electronic storage; equipment related to Wi-Fi™ technology; equipment related to Bluetooth® technology; data entry devices; or other resources. External resources 146 include available data sources 148. Available data sources 148 are those available to system 100 for searching. Available data sources 148 are heterogeneous, or not the same. Available data sources 148 comprise a large and varying set of data sources, with many different characteristics. Some or all of the available data sources 148 have at least one of different storage architectures or different query languages. In some embodiments, available data sources 148 comprise a data estate of a user with databases 151 (which themselves comprise storage technologies of various types—e.g., tabular data, graph data, embedding vectors, etc.—the approach is not restricted to just tabular data, such as Kusto tables), data tables 152, columns of data 154, documents, charts, images, video, sensor data, or other data.

For example, available data sources 148 with different storage architectures comprise different types of data repositories or systems that store information in various formats, structures, or modalities. In some embodiments, data sources 148 comprise individual databases 151, data tables 152, columns of data 154, documents, charts, images, video, sensor data, etc. These data sources are not uniform and differ in terms of data format, data models, data structure, storage architecture, access protocols, content type, etc. For example, some available data sources 148 have structured data (like databases or spreadsheets with defined rows and columns), while others have unstructured data (like text documents, images, videos, or social media posts). Different databases or systems use different data models. For example, one source might use a relational database (SQL), while another might use a NoSQL database, a graph database, or flat files. Data in some available data sources 148 is organized hierarchically (like XML or JSON), in tabular format (like in databases), or in less structured formats (like plain text or logs). Available data sources 148 comprise various physical systems like servers, cloud storage, distributed file systems, or third-party application programming interfaces (APIs). Accessing data from different available data sources 148 might involve various protocols, such as REST APIs, SQL queries, or web scraping techniques. Data can also differ in the type of content represented, such as numeric data (financial transactions), textual data (documents), multimedia (images, audio, video), or sensory data (from IoT devices), as examples.

Examples of (heterogeneous) available data sources 148 with different storage architectures include data tables 152; columns of data 154; documents; charts; images; video; sensor data; databases 151 such as relational databases; databases with structured data; databases with unstructured or semi-structured data; file systems (for files like PDFs or logs); APIs; web pages; scraped content; document, image, video, audio, or sensor data archives; etc. Prior to system 100, searching or analyzing disparate types of data in a unified way was difficult because of the differences in formats and structures. Accessing heterogeneous data sources often required data integration techniques, including data cleaning and transformation, normalization across different data structures, building middleware or interfaces to unify access to various systems, or other operations. These are not necessary with system 100.

Query languages are specialized languages configured to retrieve and manipulate data from databases or other data systems. Different query languages are designed to work optimally with different specific structures, architectures, or models of a database a query language serves. Different query languages are tailored to different kinds of data models and databases. Different query languages include SQL (Structured Query Language, used for relational databases such as MySQL, PostgreSQL, Oracle), KQL (Kusto Query Language, used for Azure Data Explorer, Log Analytics), Cypher (used for graph databases such as Neo4j), XQuery (used for XML databases), SPARQL (SPARQL Protocol and RDF Query Language, used for RDF (Resource Description Framework) databases, used in the Semantic Web), GraphQL (used for APIs and web services), MDX (Multidimensional Expressions, used for OLAP (Online Analytical Processing) databases (e.g., Microsoft SQL Server Analysis Services)), Datalog (used for deductive databases and logic programming), Gremlin (used for graph databases (e.g., Apache TinkerPop, JanusGraph)), CQL (Cassandra Query Language, used for NoSQL databases (e.g., Apache Cassandra)), etc.

In some embodiments, available data sources 148 include heterogeneous available cybersecurity data sources, as an example. Cybersecurity data can come from an especially wide range of different sources, with an especially wide range of storage architectures, query languages, or other characteristics, making system 100 useful for users making cybersecurity related input queries. Cybersecurity data comprises information collected, generated, or used to monitor, protect, detect, and respond to threats in digital systems, networks, and devices. Cybersecurity data is used for identifying security risks, analyzing potential vulnerabilities, and defending against cyberattacks. Cybersecurity data is typically collected from various sources, including networks, endpoints, servers, applications, and users. Cybersecurity data includes log data, network traffic data, threat intelligence data, vulnerability data, incident data, user behavior data, malware data, security configuration data, access control data, alert data, or other data. Log data includes records of activities on systems, networks, applications, and devices (e.g., firewall logs, web server logs, authentication logs, and system event logs). Network traffic data is data that describes the flow of information across a network (e.g., packet captures, network flows, IP addresses, port usage, etc.). Threat intelligence data includes data about known threats, including malware, phishing attacks, vulnerabilities, and attacker techniques (e.g., lists of known malicious IP addresses or domains, malware signatures, vulnerability databases (CVE), and indicators of compromise (IOCs), etc.) Vulnerability Data comprises information about weaknesses or flaws in software, hardware, or network configurations that could be exploited by attackers (e.g., software versioning information, patch management reports, vulnerability assessment results, etc.). Incident Data comprises data generated during or after a cybersecurity incident (e.g., incident reports, forensic data, attack timelines, affected systems, etc.). User behavior data comprises data that tracks user activities on systems and networks (e.g., log in times, access patterns, file downloads, email activity, etc.). Malware data comprises data related to malware (viruses, trojans, ransomware, etc.), used to identify and defend against malicious software (e.g., malware samples, file hashes, behavioral analysis of malware execution, etc.). Security configuration data comprises information about how systems, networks, and applications are configured in terms of security settings (e.g., firewall rules, access control settings, encryption protocols, password policies, etc.). Access control data comprises data that tracks who has access to what systems, files, and applications (e.g., user roles, access logs, authentication attempts, multi-factor authentication (MFA) data, etc.). Alert data comprises automated alerts generated by security systems when suspicious or malicious activity is detected (e.g., alerts from intrusion detection/prevention systems (IDS/IPS), antivirus software, or security information and event management (SIEM) systems, etc.).

In some embodiments, (other or non-cybersecurity) available data sources 148 include heterogeneous geospatial data sources (e.g., with data related to the location and features of the earth's surface such as global positioning system (GPS) coordinates, satellite imagery, geographic maps, real-time traffic data, etc.), educational data sources (e.g., with statistics related educators and academic institutions, course materials, etc.), social media data sources (e.g., with data generated from social networks and online platforms), manufacturing and industrial data sources (e.g., with data collected from production processes, machinery, and industrial operations, etc.), environmental data sources (e.g., storing data related to weather patterns, pollution levels, wildlife tracking, climate change models, etc.), transportation and logistics data sources (e.g., with fleet management data, delivery tracking data, public transit schedules, traffic data, etc.), energy and utilities data sources (e.g., with data related to energy production, consumption, and distribution), marketing and advertising data sources (e.g., ad performance data, customer demographics, website traffic analytics, consumer surveys, etc.), telecommunications data sources (e.g., with call logs, internet bandwidth usage, mobile data consumption, text message data, etc.), legal and compliance data sources (e.g., with data related to laws, regulations, compliance monitoring, etc.), agricultural data sources (e.g., with crop yields, soil moisture levels, pest control data, weather impact on agriculture, etc.), sports and fitness data sources (e.g., with player statistics, fitness tracker data, game results, training metrics, etc.), entertainment and media data sources (e.g., with movie ticket sales, streaming platform metrics, music playlists, viewer ratings, etc.), healthcare data sources (e.g., data related to patient access, distribution of healthcare resources, treatment success rates, etc.), financial data sources (e.g., data related to financial transactions, stock market activity, banking, accounting, etc.), retail and E-commerce data sources (e.g., data generated from retail sales, customer preferences, online shopping behavior, etc.), or other available data sources 148.

Even though only a small number of available data sources 148 are shown in FIG. 1A, these are intended to represent tens, hundreds, thousands, millions, or billions of different available data sources 148. In some embodiments, some or all of the different available data sources 148 are co-located (e.g., in a database server associated with a user), or individual available data sources 148 are located remotely from other data sources 148 (e.g., in different database servers associated with an organization and located across the world).

In some embodiments, some or all of the functionality attributed to external resources 146 is provided by resources included in system 100. External resources 146 are configured to communicate with computing engine 112, mobile user devices 134 and 136, desktop user device 138, or other components of system 100 via wired or wireless connections, via network 150 (e.g., a local area network and/or the internet), via cellular technology, via Wi-Fi technology, or via other resources.

Thus, computing engine 112, in some embodiments, operates in the illustrated environment by communicating with a number of different devices and transmitting instructions to various devices to communicate with one another. The number of illustrated external resources 146, desktop user devices 138, and mobile user devices 136 and 134 is selected for explanatory purposes only, and embodiments are not limited to the specific number of any such devices illustrated by FIG. 1A, which is not to imply that other descriptions are limiting.

Memory 130 stores instructions 160 that, when executed by processor 114, cause processor 114 to execute the various operations described herein. In some embodiments, memory 130 stores or is configured to access other data required for dynamic agent-based searching over heterogeneous data sources, or other information that otherwise allows system 100 to function as described herein. In some embodiments, memory 130 includes various types of data stores, including relational or non-relational databases; image, document, etc., collections; or programming instructions related to storage and execution of a related multimodal model (large language models, generative models, etc.) for example. In some embodiments, such components are formed in a single database, or are stored in separate data structures. In some embodiments, memory 130 comprises electronic storage media that electronically stores information. In some embodiments, the electronic storage media of memory 130 includes one or both of system storage that is provided integrally (i.e., substantially non-removable) with system 100 or other storage that is connectable (wirelessly or via a wired connection) to system 100 via, for example, a port, a drive, a network (e.g., the Internet), etc. In some embodiments, memory 130 is (in whole or in part) a separate component within system 100, or memory 130 is provided (in whole or in part) integrally with one or more other components of system 100 (e.g., processor 114). In some embodiments, memory 130 is located in a data center, in a server that is part of external resources 146, in a computing device 134, 136, or 138, or in other locations. In some embodiments, memory 130 includes one or more of optically readable storage media, magnetically readable storage media, electrical charge-based storage media (e.g., EPROM, RAM, etc.), solid-state storage media, or other electronically readable storage media. In some embodiments, memory 130 stores software algorithms, information determined by processor 114, information received (e.g., a user input query) via a graphical user interface displayed on computing devices 134, 136, or 138, information received from external resources 146 (e.g., data from a search of an available data source 148), or other information accessed by system 100 to function as described herein.

Processor 114 is configured to coordinate the operation of the other components of computing engine 112 to provide the functionality described herein. In some embodiments, processor 114 is formed by two or more processors, for example. As shown in FIG. 1A, in some embodiments, instructions 160 comprise a representation module 116, an intent module 118, a task module 120, a search module 122 (which in turn comprises search agents 123), and an output module 124. Processor 114 is configured to direct the operation of modules 116, 118, 120, 122, or 124 by software; hardware; firmware; some combination of software, hardware, or firmware; machine-readable instructions; or other mechanisms for configuring processing capabilities.

Representation module 116 is configured to determine a data map representation for available data sources 148. The data map representation is a visual, logical, relational, or graphical (or some combination thereof) representation that defines how data from one available data source 148 corresponds or is otherwise related to another data source 148, or how data within a data source 148 is related. The data map representation indicates relationships between available data sources 148. In some embodiments, the relationships between available data sources 148 comprise at least one of semantic similarities, joinable fields, common labels, or metadata indicative of commonalities between data in available data sources 148, for example. In some embodiments, the data map representation comprises at least one of a data map graph, a semantic similarity graph, a metadata database (with embedding storage), a graph of metadata associated with different databases, or other data map representations.

The data map representation enhances data integration, migration, aggregation, or other operations to ensure that data is used accurately to respond to a user input query. In some embodiments, the data map representation indicates how fields in one database relate to those in another; facilitates transfer of data from one available data source 148 to a new one by mapping old data fields to the new data source's structure; defines rules or logic for combining, transforming, or converting data (e.g., data type conversions, formatting changes, calculations, etc.); ensures that data is correctly and consistently represented between different data sources 148; or has other purposes.

In some embodiments, determining the data map representation comprises generating at least one of descriptions or metadata for available data sources 148. The descriptions or metadata are configured to enhance semantic understanding of data in an available data source 148. In some embodiments, the data map representation includes human annotations, or other information. For example, in some embodiments, metadata (e.g., schema names/types, a data sample, etc.) is used to generate a description. An embedding is determined from the "enriched" metadata with the description. These embeddings and enriched metadata are used to generate a data map representation based on a combination of a metric applied to the embeddings and other relationship generation prompts using a multimodal model (e.g., a large language model).

In some embodiments, the data map representation is determined using various semantic functions. A semantic function comprises an algorithm configured to capture meaning behind data in available data sources 148, rather than surface-level structure of the data in available data sources 148. A semantic function is configured to provide information about how to query a relevant data source. A semantic function is configured to provide information about how data between two or more different available data sources 148 is related. In some embodiments, a semantic function provides information about how to effectively query a single available data source 148, or multiple available data sources 148.

For example, a semantic function can be configured to determine whether a given column of data in an available data source 148 is an enumeration (e.g., a data type that restricts a column's values to a predefined set of options), and if so, determine the enumeration values and their approximate frequencies. As another example, a semantic function can be configured to determine whether a given column has values that conform to a common pattern. As a third example, a semantic function can be configured to provide information about how one or more columns of data connect between two data sources 148 (e.g., which is helpful when performing joins between data sources). In some embodiments, existing columns of data between two available data sources 148 can be used by semantic functions as join keys. In some embodiments, a semantic function is configured to perform a transformation of one or more columns of data for one, two, or more available data sources 148 to derive a join key. In some embodiments, semantic functions comprise natural language inference, question answering models, paraphrase detection functions, a semantic similarity comparator, word sense disambiguation, named entity recognition, text embedding models, or other semantic functions. The present approach allows for any number of semantic relationships, but typically only the most relevant ones for application(s) of interest (e.g., a cybersecurity application) are used.

Figure 3:
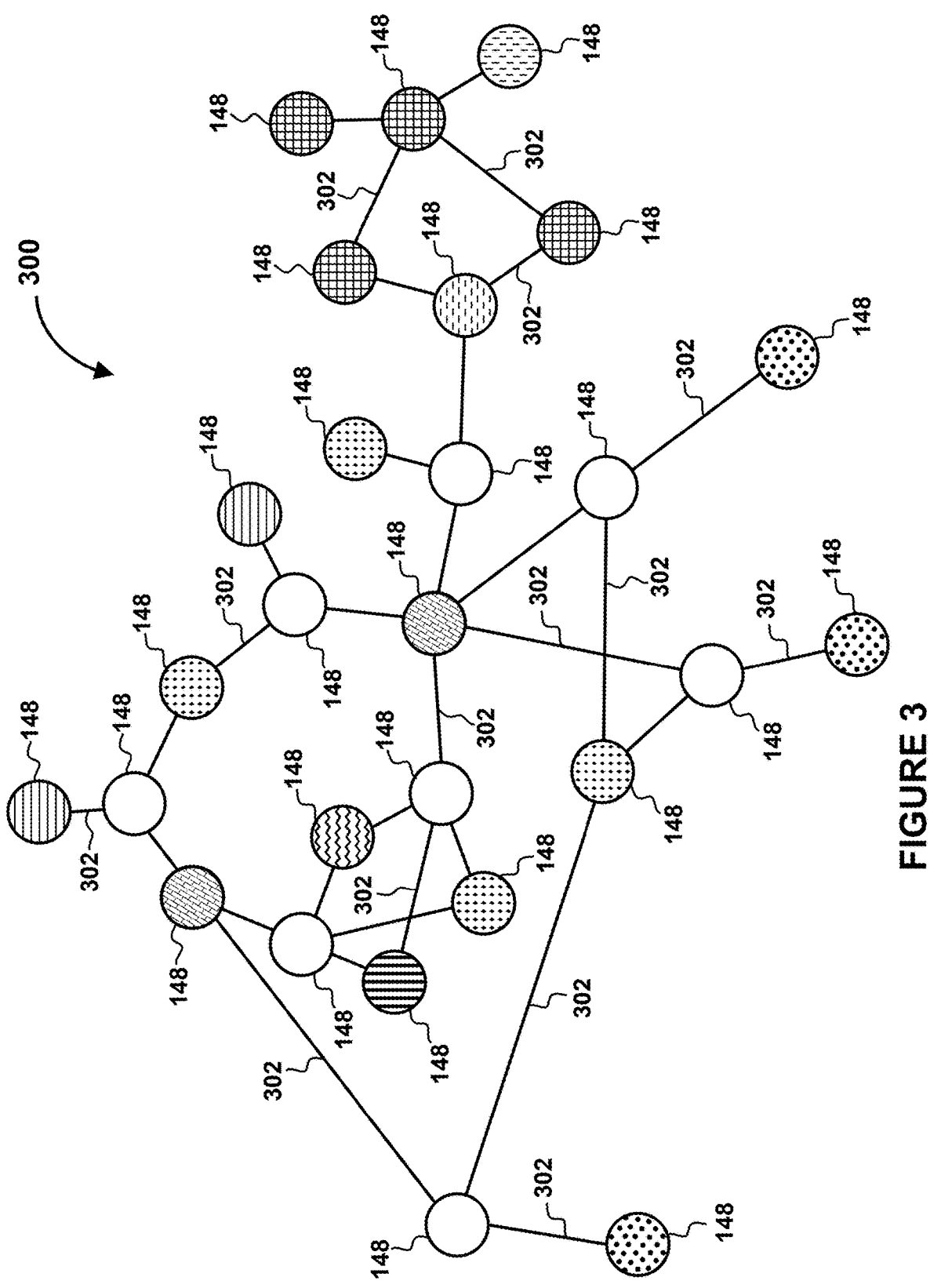
FIG. 3 illustrates an example of a data map representation for available data sources.

For example, FIG. 3 illustrates an example of a data map representation 300 for available data sources 148 (determined by representation module 116 shown in FIG. 1A). Data map representation 300 is a visual representation that defines how data from one available data source 148 corresponds to or is otherwise related to another data source 148. In some embodiments, data map representation 300 is a multi-graph with multiple relations possible between the same nodes. Each of these correspond to one of the semantic functions mentioned earlier. For example, FIG. 3 illustrates various linkages 302 and different shading patterns to indicate relationships between available data sources 148. As described above, these relationships between available data sources 148 comprise semantic similarities, joinable fields, common labels, metadata indicative of commonalities between data in available data sources 148, or other relationships. In FIG. 3, a first shading pattern indicates common data or data labels, a second shading pattern indicates metadata indicative of commonalities, etc. Linkages 302 indicate semantic similarities or relationships that suggest other connections between available data sources 148, for example.

Returning to FIG. 1A, intent module 118 is configured to determine a query intent associated with an input query. In some embodiments, the input query is received via a user interface of a mobile or desktop computing device, and communicated to intent module 118 as described herein. In some embodiments, the input query is an electronic request or other query from a different computing system. The input query comprises one or more modality types such as text, image, video, audio, signal, byte sequence, code, electro-magnetic inputs, or other inputs. For example, in some embodiments, an input query includes a text portion (e.g., that asks a question, provides a command, provides an example), an image (e.g., of a log file), a numerical data table, a pointer to an external database, etc. As another example, in some embodiments, a textual input query is derived from an input query of a different modality type (e.g., spoken words in a video may be transcribed into a textual query). In some embodiments, an input query asks system 100 to output certain information (e.g., a list of compromised accounts using a cybersecurity related example), or perform other actions.

In general, a user's input intent refers to the underlying goal or purpose that a user is trying to achieve with an input or query. It is what the user intends intent module 118 to understand, address, or provide in response to the query. A user's input intent goes beyond the literal words or structure of the query and focuses on the meaning or action the user wants. Intent module 118 is configured to infer why the user is asking a question or making a request, for example. Specifically, intent module 118 is configured to determine a query intent (or sub-query intents as described herein) comprising an inference as to why the user asked a certain question or made a certain request. The query intent is used to guide specific query intent tasks for relevant data sources. The query intent is used in combination with a data map representation (e.g., data map representation 300 shown in FIG. 3) to identify relevant available data sources 148. Thus, a query intent determined by intent module 118 (e.g., an intent for one or more query intent tasks) is distinguished from a user's input intent in the user's input query, though these may overlap significantly, or even be the same in some embodiments.

Intent module 118 is configured such that query intent is influenced by the context in which the query is made, entities included in the query, or other information. For example, intent module 118 determines query intent by identifying entities and context associated with the input query. This facilitates recognizing commands or actions embedded in the query, recognizing vague or ambiguous queries (e.g., which require searching multiple different available data sources 148), disambiguating multiple possible intents, or other operations. The query intent or intents (e.g., the sub-query intents described herein) determined by intent module 118 comprise a query intent for a query intent (or search) task, as described below.

An entity is a specific, identifiable piece of information within a query that refers to a real-world object, concept, or value. Entities are often nouns or proper names that can represent things like people, places, organizations, products, dates, numbers, measurable quantities, or other concrete, distinguishable concepts. Entities are often associated with an application of interest. For example, in a cybersecurity application, a user might ask system 100 to list computing devices or user accounts compromised by ransomware. In this query, the application of interest is cybersecurity. Entities associated with cybersecurity in the query include devices, accounts, and ransomware, as three examples.

In some embodiments, entities comprise tokens associated with at least one of specific, identifiable items or concepts that have meaning (e.g., a real-world object, concept, value, person, place, product, date, quantity, etc.) within the input query. A token is a fundamental unit (e.g., of text) that intent module 118 uses to process and understand the query. Tokenization comprises breaking input text into smaller pieces, or tokens, which include words, subwords, characters, punctuation marks, or other tokens. Continuing with the cybersecurity example above, entity tokens comprise the individual words "devices," "accounts," and "ransomware."

Context refers to the surrounding information or circumstances that give meaning to a query, a word or words in the query, or a phrase in the query. Context helps intent module 118 understand how to interpret the query in its entirety, to determine query intent. Context can be derived from previous interactions or queries, background information about the user (e.g., location, preferences), a logical or temporal relationship between words in the current query, etc. In some embodiments, context in a query includes verbs, adjectives, or other things that enhance understanding of entities mentioned in the query. In some embodiments, the context functions as or provides a filter for a search. In some embodiments, an entity can form context for a second entity. In some embodiments, determining the query intent associated with an input query comprises decomposing the input query by evaluating qualifiers in the input query related to at least one of the entities or the context. In some embodiments, context comprises tokens associated with at least one of surrounding information, background, or situational factors present in the input query that influence determining the query intent associated with the input query.

For example, keeping with the cybersecurity application, where a user asks system 100 to list computing devices or user accounts compromised by ransomware, context includes the verb "list," the word "or" (indicating that the user is interested in multiple items), the verb "compromised," and the word "by" (indicating that whatever comes after this word is what has done the compromising). In some embodiments, these words comprise context tokens.

In some embodiments, the entity, context, or other tokens are encoded in an embedding, which is used as a means for pivoting into the data map representation (e.g., data map representation 300 shown in FIG. 3). An embedding is a relatively lower dimensional numerical or other representation of an input query. This relatively lower dimensional representation requires less computing power to use to identify query intent. In some embodiments, the embeddings are used to perform semantic alignment between entities (e.g., a sub-query intent relating to a set of table columns). This alignment is not simply injected into a prompt (i.e., RAG), but rather used to pivot into the data map representation. At this pivot point, additional graph context can be determined and/or a data map representation can be traversed (or further traversed) to find additional relevant context. For example, columns from two tables relevant to a user query may be identified, but not directly related in the data map representation. System 100 is configured to traverse the data map to find ways these table might be joined or otherwise linked.

In some embodiments, multiple sub-query intents associated with the input query are determined in the same way (by identifying the entities and context, qualifiers, or other information, associated with the input query). A sub-query intent refers to a more specific goal or purpose that falls under the broader, primary query intent. When determining sub-query intents based on a user's input query, it is possible for multiple ones of these sub-query intents to map to the same or different available data sources 148. For example, if the cybersecurity application example input query from above asks system 100 to list computing devices or user accounts compromised by ransomware, and also determine how the attack started, intent module 118 is configured to determine sub-query intents associated with listing computing devices compromised by ransomware, listing user accounts compromised by ransomware, and also determine how the attack started. These sub-query intents map to the same or different available data sources 148.

Task module 120 is configured to determine a query intent task by mapping a query intent to a relevant data source 148a in the available data sources 148 according to the data map representation, and identified entities and context (e.g., reasoning). A query intent task is a specific goal or objective determined by task module 120 for a search agent 123 (described below) to accomplish. In some embodiments, a query intent task requires finding, retrieving, or interacting with information in one or more relevant data sources 148a based on the query intent or a sub-query intent determined by intent module 118, the data map representation, or other information. In some embodiments, a query intent task requires finding one or more specific pieces of information, gathering and synthesizing information from multiple relevant data sources 148a, or other operations. A query intent task comprises an indication of one or more relevant data sources 148a determined based on the data map representation, an indication of a storage architecture or query language associated with the one or more relevant data sources 148a, one or more search terms, or other information.

In some embodiments, multiple query intent tasks are determined by mapping the query intent to multiple relevant data sources (e.g., multiple instances of relevant data source 148a, which are not shown in FIG. 1A) in available data sources 148 (again according to the data map representation, and the identified entities and context). In some embodiments, multiple query intent tasks are determined by mapping multiple sub-query intents to one or more relevant data sources 148a. The mapping is according to the data map representation, and the identified entities and context. For example, in some embodiments, multiple sub-query intents map to one relevant data source 148a. As another example, multiple sub-query intents map to multiple (i.e., two, three, or more) relevant data sources 148a. Different types of data sources 148 (e.g., based on storage technology such as Kusto, SQL, neo4j/Cypher, etc.) require different search agents that know how to search that data source 148. Decomposition into sub-query intents can result in multiple sub-query intents requiring the same type of search agent (e.g., several sub-query intents mapping to Kusto tables). In this example, system 100 comprises a Kusto search agent for these sub-query intents, or combines these sub-query intents into a single sub-query intent. The combination into a single sub-query intent is useful, for example, when several sub-query intents map to the same table (e.g., the same data source 148).

Search module 122 is configured to execute a query intent task using one or more search agents 123. A search agent 123 can generally be viewed as an agent specially configured for querying a certain available data source 148 (e.g., a certain database/storage technology). This involves translation of a natural language query into a formal query language (e.g., KQL, Cypher). The search agent 123 may also be configured with additional reasoning capabilities to supplement its ability to query a data source.

A search agent 123 comprises a portion of instructions 160 that form search module 122. In some embodiments, this includes a programmed rules based routine, a neural network, a combination of these, or other structures. A search agent 123 is configured to retrieve relevant information from one or more available data sources 148. A search agent 123 is configured to process a query intent task from task module 120, refine it into suitable search terms, and run these terms through various one or more available data sources 148. A search agent 123 is configured to retrieve relevant results—potentially a combination of different types of data including data from databases 151, data from data tables 152, data from columns of data 154, data from documents, data from charts, data from images, data from video, sensor data, or other data—processes the data, and extract relevant information.

A search agent 123 is parameterized for searching one or more relevant data sources 148a. Parameterizing a search agent 123 comprises defining it in a way that allows certain aspects of it to be controlled, adjusted, or customized using variables (parameters). Instead of hardcoding specific values or behaviors, variables (parameters) are used that can take on different values, allowing for greater flexibility and reusability. With parameterization, a search agent 123 is adaptable to different inputs or configurations. This means it can be configured to process one or more different query intent tasks without being rewritten or redefined.

In some embodiments, multiple query intent tasks are executed with one or more search agents 123. For example, a single query intent task may be executed with one search agent 123 parameterized for searching a specific relevant data source 148a. In some embodiments, multiple query intent tasks are executed with multiple search agents 123 individually parameterized for searching the multiple relevant data sources 148a. Results of the multiple query intent tasks are enhanced by causing communication of information relevant to the query intent among the multiple search agents. Among other benefits, this improves latency by allowing individual search agents 123 to search a relevant data source 148a concurrently (and being specialized or individually parameterized for searching that relevant data source 148a).

Causing the communication of information relevant to the query intent among the multiple search agents 123 comprises providing output from one search agent 123 as additional input to another search agent 123 for performing that search agent's query intent task (e.g., a data file obtained by a first search agent 123 can be provided as input to a second search agent 123). This framework, where search agents 123 are sharing information, need not be linear (e.g., search agents 123 are configured to both output information to other search agents 123, and receive information as input from the other search agents 123), can be iterative, or have other characteristics. The information relevant to the query intent is determined by the multiple search agents 123 as part of executing the multiple query intent tasks. The information relevant to the query intent comprises at least one of insights conveying relevant data for satisfying the input query or a result from a given search agent's query intent task. The results of the multiple query intent tasks are aggregated and the result is output based on the aggregation.

In embodiments, a search agent 123 is configured to decide which available data source 148 (or which relevant available data sources 148*a*) to search in a variety of ways, such as by random selection of an available data source 148, a round-robin style ordering of available data sources 148, or by allowing a search agent 123 to choose based on the query intent, the results of past query intent tasks, or other information. In some embodiments, with a single search agent 123 traversing an available data source 148, the search agent 123 is configured to have a certain perspective that influences what kind of information it gleans from available data sources 148. Using a cybersecurity example, a search agent 123 may be programmed to have the perspective of a threat analyst, focused on triaging and mitigating arising threat scenarios. A search agent 123 with this perspective performs query intent (search) tasks differently from a search agent 123 which has a security architect perspective, and is more concerned about high level security vulnerabilities from security configurations and infrastructure designs. The perspective can be determined and configured based on the query intent (or sub-query intents), or other information. These perspectives can be provided in a prompt template, for example. In this example, system 100 may be configured to provide a prompt with a particular task and ask that the task be performed as if a threat hunter was the requestor.

In some embodiments, a search agent (or search agents) 123 is (are) parameterized for searching relevant data source 148*a* (or multiple relevant data sources 148*a*) but not other data sources in the available data sources 148. This means a search agent is finetuned based on characteristics of the relevant data source 148*a*. Finetuning means changing weights of a model via training, configuring one or more variables of a search algorithm, programming a search agent for searching a database with a specific storage architecture, programming a search agent according to a specific query language, or other finetuning.

Figure 4:
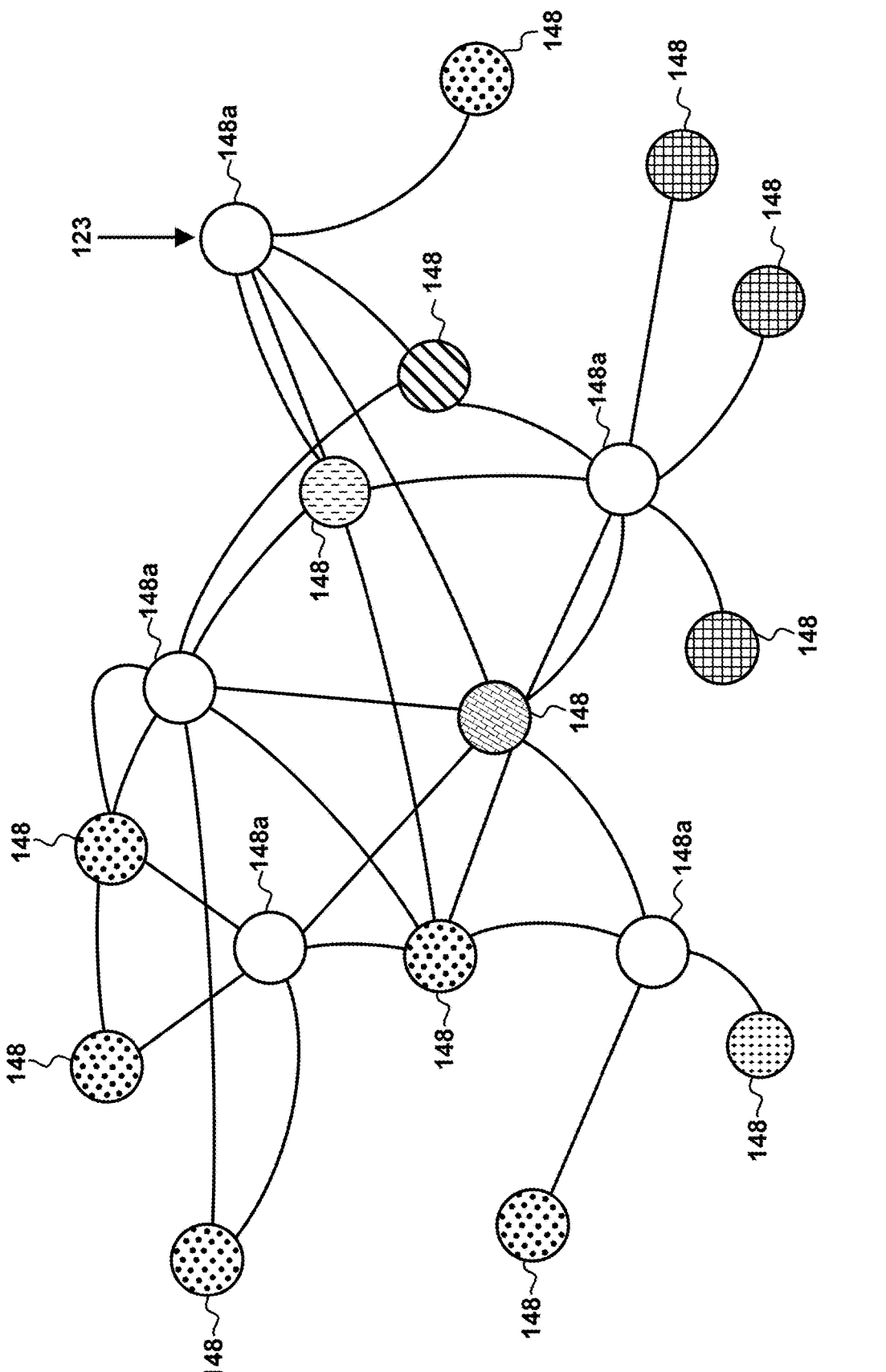
FIG. 4 illustrates a search agent parameterized for searching multiple relevant data sources from among other available data sources.

For example, FIG. 4 illustrates a search agent 123 parameterized for searching multiple relevant data sources 148*a*, from among other data sources (represented by the circles with different shading patterns) in the available data sources 148. One or more query intent tasks are executed by search agent 123. As described above, parameterizing search agent 123 comprises defining it in a way that allows certain aspects of it to be controlled, adjusted, or customized using variables (parameters). Instead of hardcoding specific values or behaviors, variables (parameters) are used that can take on different values, allowing for greater flexibility and reusability. With parameterization, search agent 123 is adaptable to different inputs or configurations. This means it can be configured to process one or more different query intent tasks and search one or more relevant data sources 148*a* (e.g., four in the example shown in FIG. 4) without being rewritten or redefined.

Returning to FIG. 1A, output module 124 is configured to output a result of an executed query intent task or tasks (e.g., an aggregated result as described above). The result of an executed query intent task or tasks (aggregated or otherwise) comprises data or other information retrieved from one or more relevant data sources 148*a* (e.g., retrieved documents or passages, images, numeric data, a list of elements, code, an algorithm, insights generated based on data queries, etc.). Outputting a result comprises providing the result as input to a multimodal model, providing the result for display via a user interface (e.g., one a mobile computing device 134 or 136, or a desktop computing device 138, etc.), providing the result for storage in memory 130, or other outputting. In some embodiments, the multimodal model is formed by (e.g., a portion of) output module 124, or formed by or included in other components of system 100 (e.g., external resources 146).

In some embodiments, output results from query intent tasks are provided to a multimodal model (e.g., such as a large language model), which integrates the output into a coherent, contextual response to a user input query. For example, in some embodiments, the result of an executed query intent task or tasks (aggregated or otherwise) comprises data or other information retrieved from a relevant data source 148*a*. The result, in this example, is output by output module 124 to a multimodal model as additional context along with the original query. The multimodal model now has two inputs—the original query, and the retrieved information. As described above, the retrieved information results from reasoned, specifically parameterized, agent-based searching of available data sources 148. The multimodal model uses both the original query and the retrieved information to generate a response. It processes the output result and integrates that information with its internal knowledge, creating a more informed and accurate output. The multimodal model generates a coherent, context-aware response based on both its own understanding and the retrieved information from the dynamic agent-based searching over heterogeneous data sources.

The result (or results) output from output module 124 provides context for queries that require more specific or technical knowledge from one or more available data sources 148 that would not have been, or been able to be, searched by prior systems. The multimodal model is configured to incorporate the output to produce a response that is linguistically fluent and factually correct. In addition, if a query is relatively complex, the multimodal model can integrate the output from output module 124 to generate a response that addresses various aspects of the query.

Figure 5:
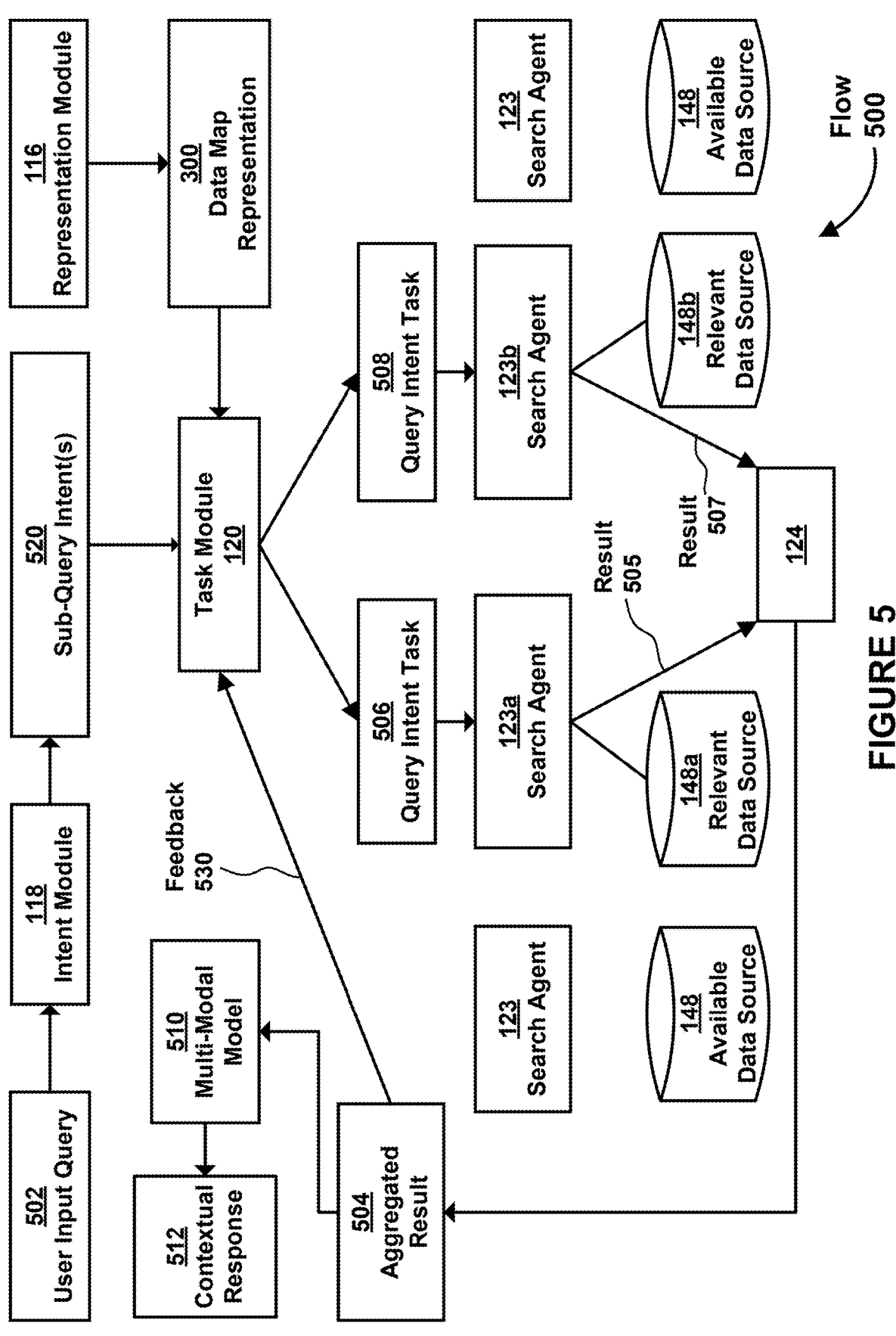
FIG. 5 illustrates an example flow of operations performed by the system shown in FIG. 1A-FIG. 1D, from receiving a user input query, to outputting results from query intent tasks to a multimodal model, which integrates the output results into a coherent, contextual response to the user input query.

For example, FIG. 5 illustrates an example flow 500 of operations performed by system 100 (FIG. 1A). FIG. 5 illustrates receiving a user input query 502, and outputting result 504 (e.g., an aggregation of results 505 and 507 in this example) from query intent tasks 506 and 508 to a multimodal model 510. The multimodal model 510 integrates the output result 504 into a coherent, contextual response 512 to user input query 502. As shown in FIG. 5, representation module 116 determines a data map representation 300 (also see FIG. 3) for available data sources 148. As described above, data map representation 300 indicates relationships between available data sources 148 (which have at least one of different storage architectures or different query languages). Intent module 118 determines one or more query intents (e.g., multiple sub-query intents) 520 associated with input query 502 based on entities and context associated with input query 502, or other information. In this example, task module 120 determines two query intent tasks 506 and 508 by mapping sub-query intents 520 to multiple relevant data sources 148*a* in the available data sources 148 according to data map representation 300, and the entities and context. For a cybersecurity application, for example, relevant data sources 148*a* comprise an incident data source and an assets data source, as two possibilities. In FIG. 5, two search agents 123*a* and 123*b* (out of the four illustrated search agents 123) execute query intent tasks 506 and 508. Search agents 123*a* and 123*b* are individually parameterized for searching relevant data sources 148*a* and 148*b*. Output module 124 aggregates results 505 and 507 of query intent tasks 506 and 508; and outputs aggregated result 504. In some embodiments, some or all of result 504 is provided as feedback 530 to task module 120 to refine future query intent tasks, or for other purposes.

As another example, FIG. 6 illustrates a user input query 600 (which is similar to or the same as user input query 502 shown in FIG. 5 or other user input queries discussed herein) and a corresponding response 602 (e.g., which is similar to or the same as response 512 shown in FIG. 5) from system 100 (FIG. 1A). In this example, there are three different portions 604, 606, and 608 of response 602. In some embodiments, these portions 604, 606, and 608 correspond to three query intent tasks determined by mapping sub-query intents associated with input query 600 to multiple relevant data sources according to a data map representation, and entities and context, as described above. Output results from query intent tasks are provided to a multimodal model (e.g., such as a large language model), which integrates the output into a coherent, contextual response 602 to user input query 600.

Putting the example shown in FIG. 6 in a cybersecurity context, input query 600 could ask system 100 (FIG. 1A) to show computing devices and user accounts compromised by ransomware. Input query 600 could request a description of how the ransomware attack started, and whether there was exfiltration activity. Input query 600 could also request recommended disruption actions that should be taken in case there are compromised computing devices or user accounts. Performing the operations discussed above (e.g., determining a data map representation, determining sub-query intents, determining query intent tasks, executing those tasks, aggregating and outputting results, etc., as discussed related to FIG. 1A-FIG. 5), system 100 could generate portion 604 of response 602 to state that the ransomware compromised computing devices X, Y, and Z, providing IP addresses or other information about each computing device. Portion 606 could state that the ransomware attack was started by a phishing technique that persuaded user A to click a malware embedded phishing link, which downloaded the ransomware onto user A's computing device. Portion 608 could list recommended actions including isolating infected computing devices, taking user A's account offline, restoring systems from back-ups, notifying a company legal department, or other actions.

Figures 1B, 1C, 1D:
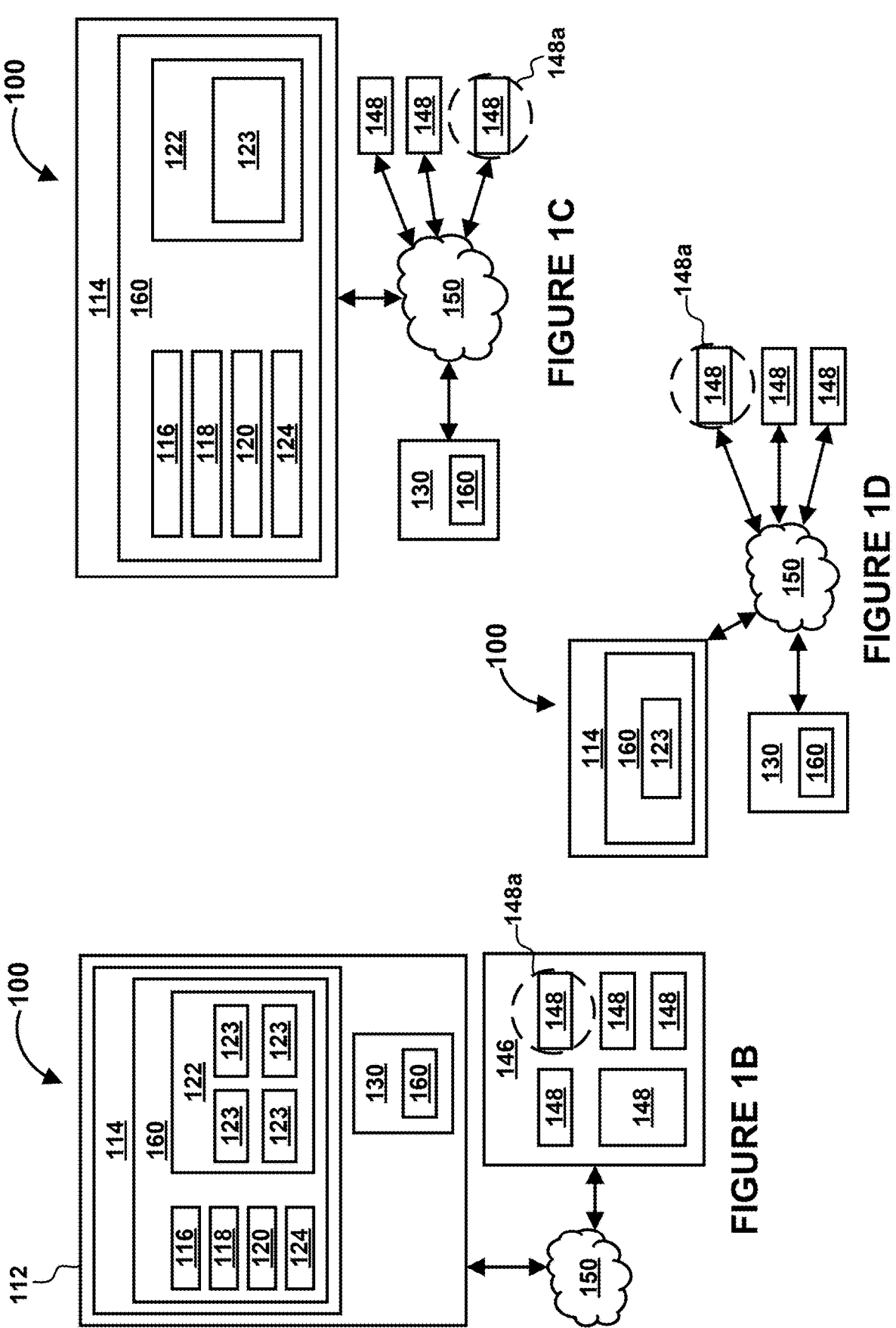
FIG. 1B illustrates a second potential embodiment of the system shown in FIG. 1A.
FIG. 1C illustrates a third potential embodiment of the system shown in FIGS. 1A and 1B.
FIG. 1D illustrates a fourth potential embodiment of the system shown in FIG. 1A, FIG. 1B, and FIG. 1C.

Returning to FIG. 1A, system 100 can have many different forms, with or without some or all of the components shown in FIG. 1A, and still be configured to function as described. For example, FIG. 1B, FIG. 1C, and FIG. 1D illustrate examples of alternative potential embodiments of system 100. FIG. 1B illustrates system 100 without API server 126, web server 128, cache server 132, mobile user devices 134 and 136, or desktop user device 138 (e.g., which in this example are their own standalone devices, apart from system 100). FIG. 1C illustrates system 100 with processor 114, instructions 160 (including the different modules 116-124), memory 130 (which may or may not be included in the same computing structure as processor 114), available data sources 148, and a relevant data source 148a. In this example, the available data sources are each their own separate entity, not necessarily being related to each other. FIG. 1D illustrates system 100 with processor 114, instructions 160 (without being separately divided into the different modules 116-124), memory 130 (which again may or may not be included in the same computing structure as processor 114), available data sources 148, and a relevant data source 148a. Other embodiments with different arrangements of components are contemplated.

In FIG. 1A-1D, the different components of system 100 are illustrated communicating via network 150. This is not intended to be limiting. As described herein, different components of system 100 communicate via network 150 (as shown), via wired connections, or via other wired or wireless connections. The illustrated components communicate directly with each other (e.g., via network 150 or a wired connection), or indirectly via other components of system 100.

Figure 7:
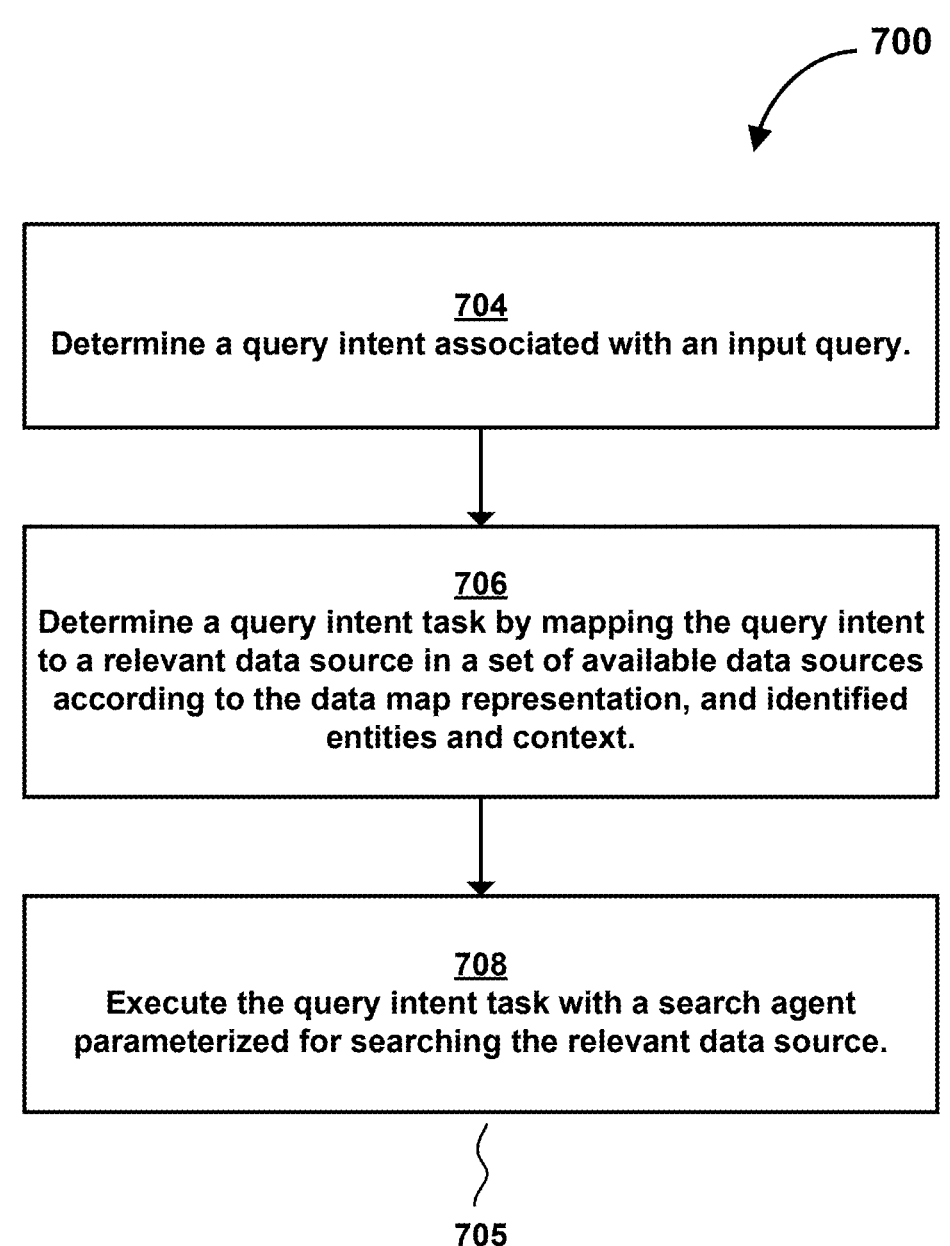
FIG. 7 illustrates different example embodiments of a method for dynamic agent-based searching over heterogeneous data sources.

FIG. 7 illustrates different example embodiments 701, 703, and 705 of a method 700 for dynamic agent-based searching over heterogeneous data sources. Embodiments 701, 703, and 705 of method 700 are performed with system 100 (FIG. 1A-FIG. 1D) or other components discussed above. Embodiments 701, 703, or 705 may correspond to one of the pathways through the flow shown in FIG. 5, for example.

Embodiment 701 of method 700 begins with operation 702, comprising determining a data map representation for available data sources. As described above, the data map representation comprises at least one of a data map graph, a semantic similarity graph, or a metadata database. The data map representation indicates relationships between the available data sources. The available data sources have at least one of different storage architectures or different query languages. The available data sources comprise a data estate of a user with at least one of databases, data tables, or columns of data. The relationships between available data sources comprise at least one of semantic similarities, joinable fields, common labels, or metadata indicative of commonalities between data in the available data sources.

Determining the data map representation comprises generating at least one of descriptions or metadata for the available data sources. The descriptions or metadata are configured to enhance semantic understanding of data in an available data source. The data map representation is determined using various semantic functions. A semantic function comprises an algorithm configured to capture meaning behind data in the available data sources, rather than surface-level structure of the data in the available data sources. A semantic function is configured to provide information about how to query the relevant data source. A semantic function is configured to provide information about how data between two or more different available data sources is related.

Embodiment 701 continues with operation 704, comprising determining a query intent associated with an input query by identifying entities and context associated with the input query. Entities comprise tokens associated with at least one of specific, identifiable items or concepts that have meaning within the input query. In some embodiments, the entities are associated with an application of interest. Context comprises tokens associated with at least one of surrounding information, background, or situational factors present in the input query that influence determining the query intent associated with the input query. Determining the query intent associated with an input query also comprises decomposing the input query by evaluating qualifiers in the input query related to at least one of the entities or the context.

Operation 706 comprises determining a query intent task by mapping the query intent to a relevant data source in the available data sources according to the data map representation, and identified entities and context. Operation 708 comprises executing the query intent task with a search agent parameterized for searching the relevant data source. In some embodiments, the search agent is parameterized for searching the relevant data source but not other data sources in the available data sources. Operation 710 comprises outputting a result of an executed query intent task (e.g., as described above).

Embodiment 703 of method 700 again begins with operation 702 (determining a data map representation for available data sources). Embodiment 703 continues with operation 712, comprising determining multiple sub-query intents associated with an input query by identifying entities and context associated with the input query. Operation 714 comprises determining multiple query intent tasks by mapping the multiple sub-query intents to one or more relevant data sources in the available data sources according to the data map representation, and identified entities and context.

Operation 716 comprises executing the multiple query intent tasks with one or more search agents parameterized for searching the multiple relevant data sources. For example, in some embodiments, a single search agent is parameterized for searching the multiple relevant data sources. As another example, the multiple query intent tasks are executed with multiple search agents individually parameterized for searching the multiple relevant data sources.

Operation 718 comprises enhancing results of the multiple query intent tasks by causing communication of information relevant to the multiple sub-query intents among the multiple search agents (in embodiments where multiple search agents are used). The information relevant to the multiple sub-query intents is determined by the multiple search agents as part of executing the multiple query intent tasks. The information relevant to the multiple sub-query intents comprises at least one of insights conveying relevant data for satisfying the input query or a result from a given search agent's query intent task. Causing the communication of information relevant to the multiple sub-query intents among the multiple search agents comprises providing output from one search agent as additional input to another search agent for performing that search agent's query intent task.

Operation 720 comprises aggregating the results of the multiple query intent tasks, and operation 722 comprises outputting an aggregated result (e.g., as described above).

Embodiment 705 of method 700 begins with operation 704, again comprising determining a query intent associated with an input query by identifying entities and context associated with the input query. Embodiment 705 assumes that the data map representation for available data sources is already determined. Embodiment 705 continues with operation 706 (determining a query intent task by mapping the query intent to a relevant data source in the available data sources according to the data map representation, and identified entities and context), and ends with operation 708 (executing the query intent task with a search agent parameterized for searching the relevant data source), before outputting a result of an executed query intent task.

Embodiments 701, 703, and 705 of method 700 may include additional operations that are not described, or not include one or more of the operations described below. The operations of embodiments 701, 703, and 705 of method 700 may be performed in any order that facilitates dynamic agent-based searching over heterogeneous data sources, as described herein. Even though these are shown as separate embodiments, operations from one embodiment may be combined with another. In addition, embodiments 701-705 are not the only three possible embodiments of method 700. Other variations are contemplated.

Returning to FIGS. 1A (and 1B, 1C, or 1D), it should be noted that in some embodiments, computing engine 112 is configured such that in the above mentioned operations of processor 114, and input from users or sources of information inside or outside system 100, are processed by processor 114 through a variety of formats, including clicks, touches, uploads, downloads, etc. The illustrated components (e.g., processor 114, API server 126, web server 128, memory 130, and cache server 132) of computing engine 112 are depicted as discrete functional blocks, but embodiments are not limited to systems in which the functionality described herein is organized as illustrated by FIG. 1A. In some embodiments, the functionality provided by each of the components of computing engine 112 is provided by software or hardware modules that are differently organized than is presently depicted, for example such software or hardware is intermingled, broken up, distributed (e.g., within a data center or geographically), or otherwise differently organized. In some embodiments, the functionality described is provided by one or more processors of one or more computers executing code stored on a tangible, non-transitory, machine readable medium.

In some embodiments, computing engine 112 is provided with or within one or more portions of a multimodal model, or multiple multimodal models that include one or more neural networks. In some embodiments, these models, or portions thereof, are generated, executed, or otherwise utilized by computing engine 112 or processor 114 (or one or more of the components of processor 114) as shown in FIGS. 1A, 1B, and 1C, and described above.

In some embodiments, a multimodal model comprises a large language model (LLM), a generative model, or other models. In some embodiments, the multimodal model comprises one or more individual algorithms (e.g., that form a LLM, a generative model, a transformer, a neural network, an adapter, etc.). In some embodiments, an algorithm is a machine learning algorithm. In some embodiments, the machine learning algorithm is or includes a neural network, classification tree, decision tree, support vector machine, or other model that is trained and configured to output a response to input query. As an example, neural networks are based on a large collection of neural units (or artificial neurons). Neural networks loosely mimic the manner in which a biological brain works (e.g., via large clusters of biological neurons connected by axons). Each neural unit of a neural network is simulated as being connected with many other neural units of the neural network. Such connections can be enforcing or inhibitory in their effect on the activation state of connected neural units. In some embodiments, each individual neural unit has a summation function which combines the values of all its inputs together. In some embodiments, each connection (or the neural unit itself) has a threshold function such that the signal must surpass the threshold before it is allowed to propagate to other neural units. These neural network systems are self-learning and trained, rather than explicitly programmed, and can perform significantly better in certain areas of problem solving, as compared to traditional computer programs. In some embodiments, neural networks include multiple layers (e.g., where a signal path traverses from front layers to back layers). In some embodiments, back propagation techniques are utilized by the neural networks, where forward stimulation is used to reset weights on the "front" neural units. In some embodiments, stimulation and inhibition for neural networks is more free flowing, with connections interacting in a more chaotic and complex fashion.

Data is extracted by processor 114 or other components of system 100 from memory 130 or external resources 146, or other sources inside or outside system 100 in a secure and encrypted fashion. Data extraction by processor 114 is configured to be sufficient for system 100 to function as described herein, without compromising privacy or other requirements associated with a data source.

It should be appreciated that although modules 116-122 are illustrated in FIGS. 1A (and 1B and 1C) as being co-located, one or more of modules 116, 118, 120, 122, or 124 may be located remotely from the other modules. The description of the functionality provided by the different modules 116, 118, 120, 122, or 124 described below is for illustrative purposes, and is not intended to be limiting, as any of the modules 116, 118, 120, 122, or 124 may provide more or less functionality than is described, which is not to imply that other descriptions are limiting. For example, one or more of modules 116, 118, 120, 122, or 124 may be eliminated, and some or all of its functionality may be provided by others of the modules 116, 118, 120, 122, or 124, again which is not to imply that other descriptions are limiting. As another example, processor 114 may be configured to control one or more additional modules that perform some or all of the functionality attributed to one of the modules 116, 118, 120, 122, or 124.

Modules 116-122 are program instructions that are executable by a processor 114 to implement one or more embodiments of the present techniques. In some embodiments, program instructions include a computer program (which in certain forms is known as a program, software, software application, script, or code). A computer program is written in a programming language, including compiled or interpreted languages, or declarative or procedural languages. In some embodiments, a computer program includes a unit suitable for use in a computing environment, including as a stand-alone program, a module, a component, or a subroutine. In some embodiments, a computer program corresponds to a file in a file system. A program is stored in a portion of a file that holds other programs or data (e.g., one or more scripts stored in a markup language document), in a single file dedicated to the program in question, or in multiple coordinated files (e.g., files that store one or more modules, sub programs, or portions of code). In some embodiments, a computer program is deployed to be executed on one or more computer processors located locally at one site or distributed across multiple remote sites and interconnected by a communication network, for example.

Cache server 132 expedites access to relevant data by storing likely relevant data in relatively high-speed memory, for example, in random-access memory or a solid-state drive (e.g., formed by at least a portion of memory 130). Web server 128 serves webpages having graphical user interfaces that display one or more views that facilitate receiving entry or selection of input from a user (e.g., including a query or command that system 100 perform a certain task, providing context, etc.), or other views. API server 126 serves data to various applications that process data related to user requested tasks, or other data. The operation of these components (API server 126, web server 128, and memory 130) is coordinated by processor 114, which bidirectionally communicates with each of these components or directs the components to communicate with one another. Communication occurs by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

API server 126 is configured to communicate user input query text commands, input images, and/or other information via a protocol, such as a representational-state-transfer (REST)-based API protocol over hypertext transfer protocol (HTTP) or other protocols. API requests identify which output data is to be determined, displayed, linked, modified, added, or retrieved by specifying criteria for identifying query intent tasks, such as queries for retrieving or processing information about a particular subject. In some embodiments, API server 126 communicates with native application 140 of the mobile user device 134, native application 145 of desktop user device 138, or other components of system 100.

Web server 128 is configured to display, link, modify, add, or retrieve portions or all of an output associated with a user input query, or other information encoded in a webpage (e.g. a collection of resources to be rendered by the browser and associated plug-ins, including execution of scripts, such as JavaScript™, invoked by the webpage). In some embodiments, the graphical user interface presented by the webpage includes inputs by which the user enters or selects data, such as clickable or touchable display regions or display regions for text input. For example, context information such as screen shots, documents, etc., may be uploaded, in combination with one or more entered text commands. Such inputs prompt the browser to request additional data from web server 128 or transmit data to web server 128, and web server 128 responds to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). Web server 128 communicates with web browsers, such as web browser 142 or 144 executed by user devices 136 or 138. In some embodiments, the webpage is modified by web server 128 based on the type of user device, e.g., with a mobile webpage having fewer and smaller images and a narrower width being presented to the mobile user device 136, and a larger, more content rich webpage being presented to the desktop user device 138. In some embodiments, an identifier of the type of user device, either mobile or non-mobile, for example, is encoded in the request for the webpage by the web browser (e.g., as a user agent type in an HTTP header associated with a GET request), and web server 128 selects the appropriate interface based on this embedded identifier, thereby providing an interface appropriately configured for the specific user device in use.

Web browsers 142 and 144 are configured to receive a website from computing engine 112 having data related to instructions (for example, instructions expressed in JavaScript™) that when executed by the browser (which is executed by the processor) cause mobile user devices 134 or 136, or desktop user device 138, to communicate with computing engine 112 and facilitate user interaction with data from computing engine 112. Native applications 140 and 145, and web browsers 142 and 144, upon rendering a webpage or a graphical user interface from computing engine 112, may generally be referred to as client applications of computing engine 112, which in some embodiments may be referred to as a server. Embodiments, however, are not limited to client/server architectures, and computing engine 112, as illustrated, may include a variety of components other than those functioning primarily as a server. Three user devices are shown, but embodiments are expected to interface with substantially more, with more than 100 concurrent sessions and serving more than 1 million users distributed over a relatively large geographic area, such as a state, the entire United States, and/or multiple countries across the world.

Though not illustrated in FIG. 1A (or 1B, 1C, or 1D), computing engine 112, in some embodiments, includes multiple processors 114, an input/output I/O device interface, and a network interface via an input/output (I/O) interface. In some embodiments, multiple processors are employed to provide for parallel or sequential execution of one or more portions of the techniques described herein. The I/O device interface provides an interface for connection of one or more I/O devices to computing engine 112. I/O devices include devices that receive input (e.g., from a user) or output information (e.g., to a user). I/O devices include, for example, graphical user interfaces presented on displays (e.g., a touchscreen or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices are connected to computing engine through a wired or wireless connection. I/O devices are connected to computing engine 112 from a remote location. I/O devices located on a remote computer system, for example, are connected to computing engine 112 via network 150 and the network interface.

The network interface includes a network adapter that provides for connection of computing engine 112 to network 150. The network interface facilitates data exchange between computing engine 112 and other devices connected to network 150. The network interface supports wired or wireless communication. In some embodiments, network 150 includes an electronic communication network, such as the Internet, a local area network (LAN), a wide area network (WAN), a cellular communications network, or the like.

The I/O interface is configured to coordinate I/O traffic between processors, memory 130, the network interface, I/O devices, or other peripheral devices. The I/O interface performs protocol, timing, or other data transformations to convert data signals from one component (e.g., memory 130) into a format suitable for use by another component (e.g., processor(s) 114). In some embodiments, the I/O interface includes support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing engine 112 or multiple computer systems configured to host different portions or instances of embodiments. Multiple computer systems may provide for parallel or sequential processing/execution of one or more portions of the techniques described herein.

While various items are illustrated as being stored in memory, these items or portions of them may be transferred between memory and other storage devices for purposes of memory management and data integrity. Alternatively, in other embodiments some or all of the software components executes in memory on another device and communicates with the illustrated computer system via inter-computer communication. In some embodiments, some or all of the system components or data structures are stored (e.g., as instructions or structured data) on a computer-accessible medium or a portable article to be read by an appropriate drive, various examples of which are described above. In some embodiments, instructions stored on a computer-accessible medium separate from computing engine 112 are transmitted to computing engine 112 via transmission media or signals such as electrical, electromagnetic, or digital signals, conveyed via a communication medium such as a network or a wireless link. Various embodiments include receiving, sending, or storing instructions or data implemented in accordance with the foregoing description upon a computer-accessible medium. Accordingly, the present techniques may be practiced with other computer system configurations.

To mitigate the problems described herein, the inventors had to both invent solutions and, in some cases just as importantly, recognize problems overlooked (or not yet foreseen) by others in the field of multi-agent searching of heterogeneous data sources, and other fields. The inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium". In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several embodiments. Rather than separating those embodiments into multiple isolated patent applications, applicants have grouped these embodiments into a single document because their related subject matter lends itself to economies in the application process. But the distinct advantages and aspects of these embodiments should not be conflated. In some cases, embodiments address all of the deficiencies noted herein, but it should be understood that the embodiments are independently useful, and some embodiments address only a subset of such problems or offer other, unmentioned benefits that will be apparent to those of skill in the art reviewing the present disclosure. Due to cost constraints, some disclosed embodiments are not presently claimed and may be claimed in later filings, such as continuation applications or by amending the present claims. Similarly, due to space constraints, neither the Abstract nor the Summary sections of the present document should be taken as containing a comprehensive listing of all such embodiments or all aspects of such embodiments.

It should be understood that the description and the drawings are not intended to limit an embodiment to the particular form disclosed, but to the contrary, the intention is to cover all modifications, equivalents, and alternatives falling within the spirit and scope of the present embodiments as defined by the appended claims. Further modifications and alternative embodiments will be apparent to those skilled in the art in view of this description. Accordingly, this description and the drawings are to be construed as illustrative only and are for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method for querying heterogeneous cybersecurity data, comprising: determining a data map representation for available data sources, the data map representation indicating relationships between the available data sources, the available data sources having at least one of different storage architectures or different query languages; determining a query intent associated with an input query by identifying entities and context associated with the input query; determining a query intent task by mapping the query intent to a relevant data source in the available data sources according to the data map representation, and the entities and context; executing the query intent task with a search agent parameterized for searching the relevant data source; and outputting a result of an executed query intent task.

2. The method of embodiment 1, further comprising: determining multiple query intent tasks by mapping the query intent to multiple relevant data sources in the available data sources according to the data map representation, and the entities and context; and executing the multiple query intent tasks with one or more search agents, the one or more search agents including the search agent.

3. The method of any of the previous embodiments, further comprising: determining multiple query intent tasks by mapping the query intent to multiple relevant data sources in the available data sources according to the data map representation, and the entities and context; executing the multiple query intent tasks with multiple search agents individually parameterized for searching the multiple relevant data sources; enhancing results of the multiple query intent tasks by causing communication of information relevant to the query intent among the multiple search agents, the information relevant to the query intent determined by the multiple search agents as part of executing the multiple query intent tasks; aggregating the results of the multiple query intent tasks; and outputting the result based on an aggregation of the results of the multiple query intent tasks.

4. The method of any of the previous embodiments, further comprising: determining multiple sub-query intents associated with the input query by identifying the entities and context associated with the input query; and determining the multiple query intent tasks by mapping the multiple sub-query intents to one or more relevant data sources according to the data map representation, and the entities and context.

5. The method of any of the previous embodiments, wherein the information relevant to the query intent comprises at least one of insights conveying relevant data for satisfying the input query or a result from a given search agent's query intent task.

6. The method of any of the previous embodiments, wherein causing the communication of information relevant to the query intent among the multiple search agents comprises providing output from one search agent as additional input to another search agent for performing that search agent's query intent task.

7. The method of any of the previous embodiments, wherein the available data sources comprise a data estate of a user with at least one of databases, data tables, or columns of data.

8. The method of any of the previous embodiments, wherein the relationships between available data sources comprise at least one of semantic similarities, joinable fields, common labels, or metadata indicative of commonalities between data in the available data sources.

9. The method of any of the previous embodiments, wherein determining the data map representation comprises generating at least one of descriptions or metadata for the available data sources, the descriptions or metadata configured to enhance semantic understanding of data in an available data source.

10. The method of any of the previous embodiments, wherein the data map representation is determined using various semantic functions, wherein a semantic function: comprises an algorithm configured to capture meaning behind data in the available data sources, rather than surface-level structure of the data in the available data sources; is configured to provide information about how to query the relevant data source; and is configured to provide information about how data between two or more different available data sources is related.

11. The method of any of the previous embodiments, wherein entities comprise tokens associated with at least one of specific, identifiable items or concepts that have meaning within the input query, and wherein the entities are associated with an application of interest.

12. The method of any of the previous embodiments, wherein context comprises tokens associated with at least one of surrounding information, background, or situational factors present in the input query that influence determining the query intent associated with the input query.

13. The method of any of the previous embodiments, wherein determining the query intent associated with an input query comprises decomposing the input query by evaluating qualifiers in the input query related to at least one of the entities or the context.

14. The method of any of the previous embodiments, wherein the data map representation comprises at least one of a data map graph, a semantic similarity graph, or a metadata database.

15. The method of any of the previous embodiments, wherein the search agent is parameterized for searching the relevant data source but not other data sources in the available data sources.

16. A system for querying heterogeneous cybersecurity data, comprising: a processor; and memory storing instructions that, when executed by the processor, cause the processor to: determine a query intent associated with an input query by identifying entities and context associated with the input query; determine a query intent task by mapping the query intent to a relevant data source according to a data map representation, and the entities and context, the data map representation indicating relationships between the relevant data source and other available data sources; execute the query intent task with a search agent parameterized for searching the relevant data source; and output a result of an executed query intent task.

17. The system of embodiment 16, wherein the instructions further cause the processor to: determine multiple query intent tasks by mapping the query intent to multiple relevant data sources in the available data sources according to the data map representation, and the entities and context; and execute the multiple query intent tasks with one or more search agents, the one or more search agents including the search agent.

18. The system of any of the previous embodiments, wherein the instructions further cause the processor to: determine multiple query intent tasks by mapping the query intent to multiple relevant data sources in the available data sources according to the data map representation, and the entities and context; execute the multiple query intent tasks with multiple search agents individually parameterized for searching the multiple relevant data sources; enhance results of the multiple query intent tasks by causing communication of information relevant to the query intent among the multiple search agents, the information relevant to the query intent determined by the multiple search agents as part of executing the multiple query intent tasks; aggregate the results of the multiple query intent tasks; and output the result based on an aggregation of the results of the multiple query intent tasks.

19. The system of any of the previous embodiments, wherein the instructions further cause the processor to: determine multiple sub-query intents associated with the input query by identifying the entities and context associated with the input query; and determine the multiple query intent tasks by mapping the multiple sub-query intents to one or more relevant data sources according to the data map representation, and the entities and context.

20. The system of any of the previous embodiments, wherein the information relevant to the query intent comprises at least one of insights conveying relevant data for satisfying the input query or a result from a given search agent's query intent task.

21. The system of any of the previous embodiments, wherein causing the communication of information relevant to the query intent among the multiple search agents comprises providing output from one search agent as additional input to another search agent for performing that search agent's query intent task.

22. The system of any of the previous embodiments, wherein the available data sources comprise a data estate of a user with at least one of databases, data tables, or columns of data.

23. The system of any of the previous embodiments, wherein the relationships between available data sources comprise at least one of semantic similarities, joinable fields, common labels, or metadata indicative of commonalities between data in the available data sources.

24. The system of any of the previous embodiments, wherein determining the data map representation comprises generating at least one of descriptions or metadata for the available data sources, the descriptions or metadata configured to enhance semantic understanding of data in an available data source.

25. The system of any of the previous embodiments, wherein the data map representation is determined using various semantic functions, wherein a semantic function: comprises an algorithm configured to capture meaning behind data in the available data sources, rather than surface-level structure of the data in the available data sources; is configured to provide information about how to query the relevant data source; and is configured to provide information about how data between two or more different available data sources is related.

26. The system of any of the previous embodiments, wherein entities comprise tokens associated with at least one of specific, identifiable items or concepts that have meaning within the input query, and wherein the entities are associated with an application of interest.

27. The system of any of the previous embodiments, wherein context comprises tokens associated with at least one of surrounding information, background, or situational factors present in the input query that influence determining the query intent associated with the input query.

28. The system of any of the previous embodiments, wherein determining the query intent associated with an input query comprises decomposing the input query by evaluating qualifiers in the input query related to at least one of the entities or the context.

29. The system of any of the previous embodiments, wherein the data map representation comprises at least one of a data map graph, a semantic similarity graph, or a metadata database.

30. The system of any of the previous embodiments, wherein the search agent is parameterized for searching the relevant data source but not other data sources in the available data sources.

31. A non-transitory computer readable medium having instructions thereon, the instructions, when executed by a computer, causing the computer to perform operations for querying heterogeneous cybersecurity data comprising: determining a data map representation for available data sources, the data map representation indicating relationships between the available data sources, the available data sources having at least one of different storage architectures or different query languages; determining multiple sub-query intents associated with an input query by identifying entities and context associated with the input query; determining multiple query intent tasks by mapping the multiple sub-query intents to multiple relevant data sources in the available data sources according to the data map representation, and the entities and context; executing the multiple query intent tasks with multiple search agents individually parameterized for searching the multiple relevant data sources; enhancing results of the multiple query intent tasks by causing communication of information relevant to the multiple sub-query intents among the multiple search agents, the information relevant to the multiple sub-query intents determined by the multiple search agents as part of executing the multiple query intent tasks; aggregating the results of the multiple query intent tasks; and outputting an aggregated result.

32. The medium of embodiment 31, wherein the information relevant to the multiple sub-query intents comprises at least one of insights conveying relevant data for satisfying the input query or a result from a given search agent's query intent task.

33. The medium of any of the previous embodiments, wherein causing the communication of information relevant to the multiple sub-query intents among the multiple search agents comprises providing output from one search agent as additional input to another search agent for performing that search agent's query intent task.

34. The medium of any of the previous embodiments, wherein the available data sources comprise a data estate of a user with at least one of databases, data tables, or columns of data.

35. The medium of any of the previous embodiments, wherein the relationships between available data sources comprise at least one of semantic similarities, joinable fields, common labels, or metadata indicative of commonalities between data in the available data sources.

36. The medium of any of the previous embodiments, wherein determining the data map representation comprises generating at least one of descriptions or metadata for the available data sources, the descriptions or metadata configured to enhance semantic understanding of data in an available data source.

37. The medium of any of the previous embodiments, wherein the data map representation is determined using various semantic functions, wherein a semantic function: comprises an algorithm configured to capture meaning behind data in the available data sources, rather than surface-level structure of the data in the available data sources; is configured to provide information about how to query the relevant data source; and is configured to provide information about how data between two or more different available data sources is related.

38. The medium of any of the previous embodiments, wherein entities comprise tokens associated with at least one of specific, identifiable items or concepts that have meaning within the input query, and wherein the entities are associated with an application of interest.

39. The medium of any of the previous embodiments, wherein context comprises tokens associated with at least one of surrounding information, background, or situational factors present in the input query that influence determining the multiple sub-query intents associated with the input query.

40. The medium of any of the previous embodiments, wherein determining the multiple sub-intents associated with the input query comprises decomposing the input query by evaluating qualifiers in the input query related to at least one of the entities or the context.

41. The medium of any of the previous embodiments, wherein the data map representation comprises at least one of a data map graph, a semantic similarity graph, or a metadata database.

42. The medium of any of the previous embodiments, wherein the search agent is parameterized for searching the relevant data source but not other data sources in the available data sources.

The invention claimed is:

1. A method for querying heterogeneous cybersecurity data, comprising:

determining a data map representation for available data sources, the data map representation indicating relationships between the available data sources, the available data sources having at least one of different storage architectures or different query languages;

determining a query intent associated with an input query by identifying entities and context associated with the input query;

determining a query intent task by mapping the query intent to a relevant data source in the available data sources according to the data map representation and the entities and context;

executing the query intent task with a search agent parameterized for searching the relevant data source; and outputting a result of an executed query intent task.

2. The method of claim 1, further comprising:

determining multiple query intent tasks by mapping the query intent to multiple relevant data sources in the available data sources according to the data map representation, and the entities and context; and executing the multiple query intent tasks with one or more search agents, the one or more search agents including the search agent.

3. The method of claim 1, further comprising:

determining multiple query intent tasks by mapping the query intent to multiple relevant data sources in the available data sources according to the data map representation, and the entities and context;

executing the multiple query intent tasks with multiple search agents individually parameterized for searching the multiple relevant data sources;

enhancing results of the multiple query intent tasks by causing communication of information relevant to the query intent among the multiple search agents, the information relevant to the query intent determined by the multiple search agents as part of executing the multiple query intent tasks;

aggregating the results of the multiple query intent tasks; and outputting the result based on an aggregation of the results of the multiple query intent tasks.

4. The method of claim 3, further comprising:

determining multiple sub-query intents associated with the input query by identifying the entities and context associated with the input query; and determining the multiple query intent tasks by mapping the multiple sub-query intents to one or more relevant data sources according to the data map representation, and the entities and context.

5. The method of claim 3, wherein the information relevant to the query intent comprises at least one of insights conveying relevant data for satisfying the input query or a result from a given search agent's query intent task.

6. The method of claim 3, wherein causing the communication of information relevant to the query intent among the multiple search agents comprises providing output from one search agent as additional input to another search agent for performing that search agent's query intent task.

7. The method of claim 1, wherein the relationships between available data sources comprise at least one of semantic similarities, joinable fields, common labels, or metadata indicative of commonalities between data in the available data sources.

8. The method of claim 1, wherein determining the data map representation comprises generating at least one of descriptions or metadata for the available data sources, the descriptions or metadata configured to enhance semantic understanding of data in an available data source.

9. The method of claim 1, wherein the data map representation is determined using various semantic functions, wherein a semantic function:

comprises an algorithm configured to capture meaning behind data in the available data sources, rather than surface-level structure of the data in the available data sources;

is configured to provide information about how to query the relevant data source; and is configured to provide information about how data between two or more different available data sources is related.

10. The method of claim 1, wherein entities comprise tokens associated with at least one of specific, identifiable items or concepts that have meaning within the input query, and wherein the entities are associated with an application of interest.

11. The method of claim 1, wherein context comprises tokens associated with at least one of surrounding information, background, or situational factors present in the input query that influence determining the query intent associated with the input query.

12. The method of claim 1, wherein determining the query intent associated with an input query comprises decomposing the input query by evaluating qualifiers in the input query related to at least one of the entities or the context.

13. A system for querying heterogeneous cybersecurity data, comprising:

a processor; and memory storing instructions that, when executed by the processor, cause the processor to:

determine a query intent associated with an input query by identifying entities and context associated with the input query;

determine a query intent task by mapping the query intent to a relevant data source according to a data map representation, and the entities and context and the data map representation indicating relationships between the relevant data source and other available data sources;

execute the query intent task with a search agent parameterized for searching the relevant data source; and output a result of an executed query intent task.

14. The system of claim 13, wherein the instructions further cause the processor to:

determine multiple query intent tasks by mapping the query intent to multiple relevant data sources in the available data sources according to the data map representation, and the entities and context; and execute the multiple query intent tasks with one or more search agents, the one or more search agents including the search agent.

15. The system of claim 13, wherein the instructions further cause the processor to:

determine multiple query intent tasks by mapping the query intent to multiple relevant data sources in the available data sources according to the data map representation, and the entities and context;

execute the multiple query intent tasks with multiple search agents individually parameterized for searching the multiple relevant data sources;

enhance results of the multiple query intent tasks by causing communication of information relevant to the query intent among the multiple search agents, the information relevant to the query intent determined by the multiple search agents as part of executing the multiple query intent tasks;

aggregate the results of the multiple query intent tasks; and output the result based on an aggregation of the results of the multiple query intent tasks.

16. The system of claim 15, wherein the instructions further cause the processor to:

determine multiple sub-query intents associated with the input query by identifying the entities and context associated with the input query; and determine the multiple query intent tasks by mapping the multiple sub-query intents to one or more relevant data sources according to the data map representation, and the entities and context.

17. A non-transitory computer readable medium having instructions thereon, the instructions, when executed by a computer, causing the computer to perform operations for querying heterogeneous cybersecurity data comprising:

determining a data map representation for available data sources, the data map representation indicating relationships between the available data sources, the available data sources having at least one of different storage architectures or different query languages;

determining multiple sub-query intents associated with an input query by identifying entities and context associated with the input query;

determining multiple query intent tasks by mapping the multiple sub-query intents to multiple relevant data sources in the available data sources according to the data map representation and the entities and context;

executing the multiple query intent tasks with multiple search agents individually parameterized for searching the multiple relevant data sources;

enhancing results of the multiple query intent tasks by causing communication of information relevant to the multiple sub-query intents among the multiple search agents, the information relevant to the multiple sub-query intents determined by the multiple search agents as part of executing the multiple query intent tasks;

aggregating the results of the multiple query intent tasks; and outputting an aggregated result.

18. The medium of claim 17, wherein the information relevant to the multiple sub-query intents comprises at least one of insights conveying relevant data for satisfying the input query or a result from a given search agent's query intent task.

19. The medium of claim 17, wherein causing the communication of information relevant to the multiple sub-query intents among the multiple search agents comprises providing output from one search agent as additional input to another search agent for performing that search agent's query intent task.

20. The medium of claim 17, wherein the available data sources comprise a data estate of a user with at least one of databases, data tables, or columns of data.

* * * * *